United States Patent
Messmer et al.

(10) Patent No.: US 11,741,135 B2
(45) Date of Patent: Aug. 29, 2023

(54) IMPROVING OFFLINE MAP DATA AVAILABILITY

(71) Applicant: GOOGLE LLC, Mountain View, CA (US)

(72) Inventors: Paul Messmer, Mountain View, CA (US); David Barth, Mountain View, CA (US); Brett McLarnon, Mountain View, CA (US); Jennifer Maurer, Seattle, WA (US)

(73) Assignee: GOOGLE LLC, Mountain View, CA (US)

( * ) Notice: Subject to any disclaimer, the term of this patent is extended or adjusted under 35 U.S.C. 154(b) by 718 days.

(21) Appl. No.: 16/603,548

(22) PCT Filed: Oct. 5, 2018

(86) PCT No.: PCT/US2018/054617
§ 371 (c)(1),
(2) Date: Oct. 7, 2019

(87) PCT Pub. No.: WO2020/072074
PCT Pub. Date: Apr. 9, 2020

(65) Prior Publication Data
US 2021/0334294 A1    Oct. 28, 2021

(51) Int. Cl.
*G01C 21/00*    (2006.01)
*G06F 16/29*    (2019.01)
(Continued)

(52) U.S. Cl.
CPC ............ *G06F 16/29* (2019.01); *H04W 4/021* (2013.01); *H04W 64/003* (2013.01)

(58) Field of Classification Search
CPC ........ G06F 16/29; G06F 16/38; G06F 16/387; G06F 16/48; G06F 16/487; G06F 16/58;
(Continued)

(56) References Cited

U.S. PATENT DOCUMENTS

| 8,711,181 B1 | 4/2014 | Nourse et al. |
| 8,803,920 B2 | 8/2014 | Kalai et al. |

(Continued)

FOREIGN PATENT DOCUMENTS

| DE | 10 2017 009 510 A1 | 3/2018 |
| WO | WO-2016/191674 A1 | 12/2016 |

OTHER PUBLICATIONS

International Search Report and Written Opinion for Application No. PCT/US2018/054617, dated Feb. 15, 2019.
(Continued)

*Primary Examiner* — Matthew W Genack
(74) *Attorney, Agent, or Firm* — MARSHALL, GERSTEIN & BORUN LLP

(57) ABSTRACT

Geographic data corresponding to a certain geographic area of offline coverage is stored in a memory of a computing device. An indication of a geographic boundary delimiting a region smaller than, and contained within, the geographic area is obtained. A current location of the computing device relative to the geographic boundary is determined and, in response to determining that the current location is outside the region, additional geographic data is retrieved via a wireless communication network to expand the geographic area of offline coverage. At least some of the geographic data corresponding to the expanded geographic area is provided via a user interface of the computing device when the computing device is offline.

9 Claims, 18 Drawing Sheets

(51) Int. Cl.
*H04W 4/021* (2018.01)
*H04W 64/00* (2009.01)

(58) Field of Classification Search
CPC ...... G06F 16/587; G06F 16/68; G06F 16/687;
G06F 16/78; G06F 16/787; G06F 19/90;
G06F 16/909; H04W 4/02; H04W 4/021;
H04W 4/022; H04W 4/023; H04W 4/025;
H04W 4/026; H04W 4/027; H04W 4/029;
H04W 64/003; H04W 64/006
See application file for complete search history.

(56) References Cited

U.S. PATENT DOCUMENTS

| | | | |
|---|---|---|---|
| 8,849,942 B1 | 9/2014 | Foster et al. | |
| 8,938,488 B1* | 1/2015 | Sayed | H04L 67/535 |
| | | | 705/14.54 |
| 9,389,088 B2 | 7/2016 | Kalai et al. | |
| 9,563,976 B2 | 2/2017 | Kalai et al. | |
| 9,734,072 B2 | 8/2017 | Svendsen | |
| 9,769,030 B1 | 9/2017 | Ramalingam et al. | |
| 9,786,027 B1 | 10/2017 | Cooley et al. | |
| 2013/0124563 A1 | 5/2013 | CaveLie et al. | |
| 2014/0378159 A1 | 12/2014 | Dolbakian et al. | |
| 2014/0379850 A1 | 12/2014 | Peterson | |
| 2015/0017950 A1* | 1/2015 | Zhao | H04W 12/06 |
| | | | 455/411 |
| 2015/0286741 A1 | 10/2015 | Zhu et al. | |
| 2016/0180721 A1* | 6/2016 | Otulic | B63H 25/02 |
| | | | 701/2 |
| 2017/0325064 A1 | 11/2017 | Kernan | |
| 2018/0352374 A1* | 12/2018 | Ball | G06F 16/9537 |

OTHER PUBLICATIONS

First Examination Report for India Application No. 202047057206, dated Jan. 6, 2022.

* cited by examiner

FIG. 12A  FIG. 12B

IMPROVING OFFLINE MAP DATA AVAILABILITY

FIELD OF THE DISCLOSURE

The present disclosure relates to digital maps and, more particularly, to generating digital maps that include information of interest specifically to the user viewing the digital map.

BACKGROUND

Today, numerous electronic devices such as personal computers, tablets, mobile phones, navigators provided as special-purpose devices or embedded into head units of vehicles, etc. can provide digital maps of geographic areas as well as step-by-step directions for navigating through geographic areas by driving, walking, bicycling, or using public transport. Special-purpose mapping applications or "apps" as well as general-purpose applications such as web browsers can provide digital maps and/or navigation directions.

Many geographic systems today retrieve geographic data, such as map data to render digital maps or point-of-interest data to service geographic search queries, from network servers. These geographic systems retrieve data as needed and no longer rely on permanent pre-stored databases. However, these systems often encounter problems with connectivity or insufficient bandwidth and, as a result, a device at a certain location sometimes cannot generate a digital map or service a geographic query.

SUMMARY

A client device of this disclosure retrieves geographic data for geographic areas of offline coverage prior to reaching locations in these geographic areas, from a server via a wireless communication network. An offline management system determines the extent of the area of offline coverage as well as when the client device should request additional geographic data. The area of offline coverage is based on predicted destinations to which the client device is likely to travel as well as a padding region for these predicted destinations. The offline management system can determine the extent of the area of offline coverage in view of the quality of network coverage, e.g., using estimated bandwidth for various service providers at the various regions and the speed at which the client device is expected to move through these regions. The management system thereby reduces the probability that the client device neither can retrieve the relevant geographic area from the server nor has the relevant geographic area pre-stored in its memory.

When determining the extent of the area of offline coverage, the offline management system can use the navigation route along which the client device current is moving or, when no navigation route has been requested, likely destinations to which client devices generally tend to travel from the current location of the client device. More generally, the offline management system can use any suitable combination of non-personal signals (e.g., popularity of locations, historical data, availability and size of roads leading to the locations) as well as personal signals (e.g., locations previously visited by the user operating the client device or locations "liked" by the user, when the user has indicated, by operating certain controls or installing certain applications, that the offline management system can use the personal signals to retrieve geographic data).

To determine the padding region, the offline management system in an example implementation calculates the amount of data the client device is expected receive at various geographic locations, which can be mapped to cells of a certain fixed size (at least upon transformation or projection) to make computation finite, and determines various locations the client device can reach for a given "budget" expressed as a number of megabytes of data, for example. The offline management system then determines the amount of data required to cover the region made up of these locations reachable for the given budget, and adjusts the budget as needed. The offline management system then repeats these calculations until the values representing the amount of data required to cover the region and the budget converge.

Further, to service client devices in real time more efficiently, the server-side component of the offline management system can pre-calculate geographic data that covers likely destinations for geographic locations as well as padding regions for various locations.

One example embodiment of these techniques is a method for obtaining geographic data for offline use. The method includes storing, in a memory of a computing device, geographic data corresponding to a certain geographic area of offline coverage; obtaining, by one or more processors, an indication of a geographic boundary delimiting a region smaller than, and contained within, the geographic area; determining, by the one or more processors, a current location of the computing device relative to the geographic boundary; in response to determining that the current location is outside the region, retrieving additional geographic data via a wireless communication network to expand the geographic area of offline coverage; and providing at least some of the geographic data corresponding to the expanded geographic area when the computing device is offline.

In various implementations, this method includes one or more of the following additional features. Retrieving the additional geographic data includes transmitting, to a network server, a request specifying the current location of the computing device and an indication of the geographic area of offline coverage. The request further specifies a network carrier of the computing device at the current location. The request further specifies a navigation route which the computing device is following. The request further specifies a current speed and/or an expected future speed of travel of the computing device. Retrieving the additional geographic data includes receiving, from a network server, geographic data for locations to which the computing device is likely to travel. Requesting the additional geographic data includes requesting map data for rendering digital maps.

Another example embodiment of these techniques is a computing device comprising one or more processors and a non-transitory computer-readable memory that stores instructions. When executed by the one or more processors, the instructions cause the computing device to implement any of the methods above.

Yet another example embodiment of these techniques is a method for providing geographic data to client devices for offline use. The method includes receiving, by one or more processors from a client device via a communication network, an indication of a current location of the client device; identifying, by the one or more processors, geographic data to be provided to the client device to define an area of offline coverage, including determining boundaries of the area of offline coverage based on an amount of geographic data the client device is expected to receive prior to reaching certain points within the area of offline coverage; and providing the geographic data to the client device.

In various implementations, this method includes one or more of the following additional features. Determining the boundaries of the area of offline coverage comprises determining, within the area of offline coverage, a region smaller than the area of offline coverage and contained within the area of offline coverage, such that the client device is expected to receive the geographic data for the region of offline coverage by the time the client reaches any point in the region. The method includes providing an indication of a boundary of the region to the client device so that the client device requests additional geographic data upon reaching the indicated boundary. The method includes receiving, from the client device via the communication network, an indication of a geographic area for which the client device currently stores previously received geographic data. When the method includes receiving this indication, the method can include determining whether a version of the previously received geographic data is suitable for use for the region of offline coverage, and not providing the previously received geographic data to the client device when the version of the previously received geographic data is suitable for use for the region of offline coverage. The method includes determining network bandwidth for cells within the region based on historical data.

Still another example embodiment of these techniques is a method for providing geographic data to client devices for offline use. The method includes receiving, by one or more processors from a client device via a communication network, an indication of a current location of the client device; identifying, by the one or more processors, geographic data to be provided to the client device to define an area of offline coverage, including determining, within the area of offline coverage, a region such that the client device is expected to receive the geographic data for the region of offline coverage by the time the client reaches any point in the region; and providing the geographic data along with an indication of a boundary of the region to the client device so that the client device requests additional geographic data upon reaching the indicated boundary.

BRIEF DESCRIPTION OF THE DRAWINGS

FIGS. 12A-C schematically illustrate an example scenario in which a client device reaches the check-in bounds and requests additional geographic data;

DETAILED DESCRIPTION

Figure 1:
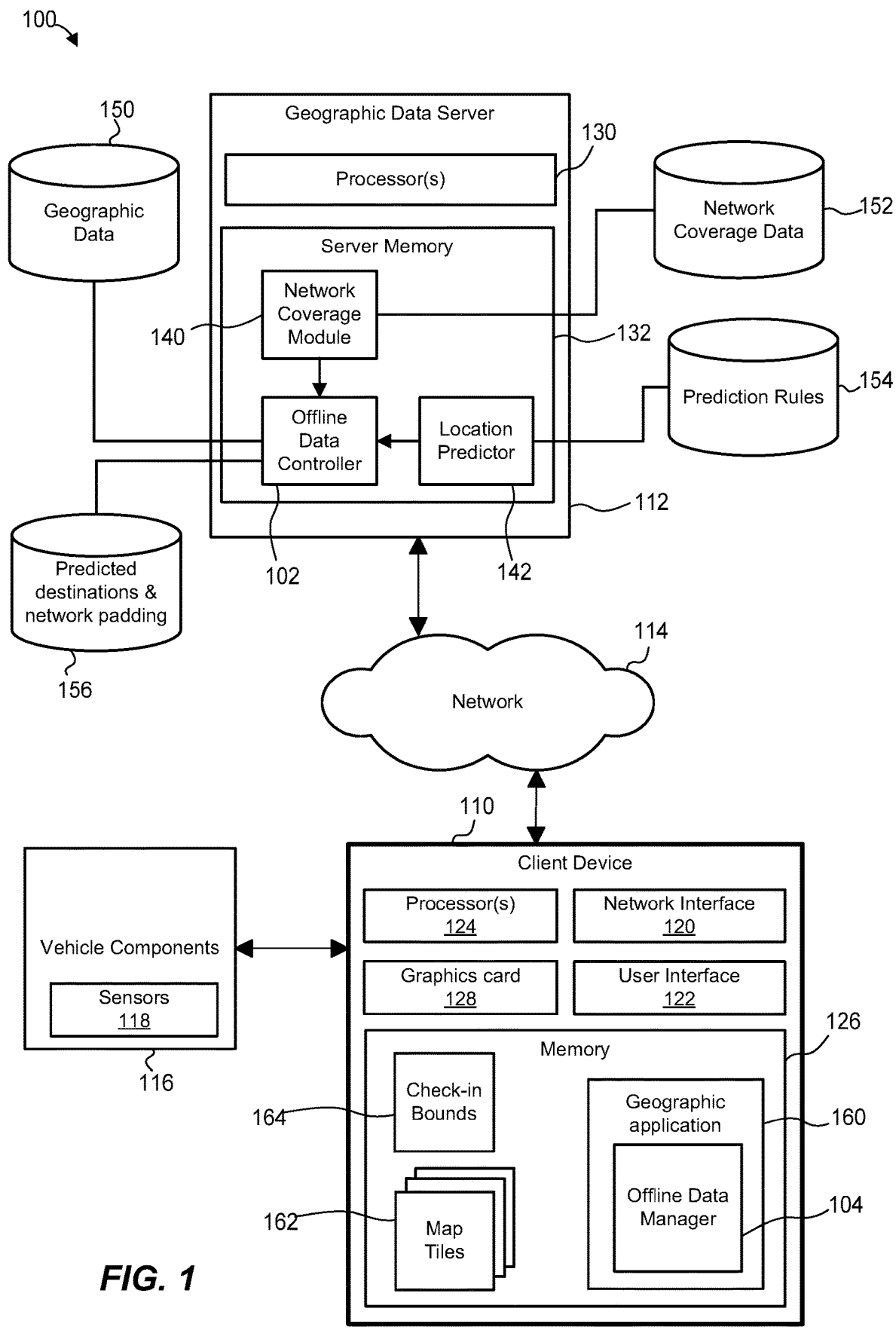
FIG. 1 is a block diagram of an example system in which the offline management system of this disclosure can operate.

An offline management system of this disclosure can be implemented in a computing environment 100 of FIG. 1. The offline management system can include an offline data controller 102 as well as an offline data manager 104 defining a server-side component and a client-side component, respectively. Some of the functionality discussed below can be implemented in the offline data controller 102, some can be implemented in the offline data manager 104, and some can be distributed between the components 102 and 104.

The example computing environment 100 includes a client device 110, a geographic data server 112, and a communication network 114 which can be a wide area network (WAN) such as the Internet.

The client device 110 in one example implementation operates as a component of a vehicle. For example, the client device 110 can be a navigation device embedded in the head unit of the vehicle to provide mapping, navigation, search, and other functionality. The client device 110 in this implementation can be communicatively coupled to vehicle components 116 which can include various sensors 118 that indicate location, orientation, speed, temperature, various operational parameters of the vehicle such as tire pressure or whether the windshield wipers have been activated, etc.

In another implementation, the client device 110 is a portable computing device such as a smartphone that is communicatively coupled to the head unit of a vehicle via a wired or wireless short-range network interface such as Universal Serial Bus (USB) or Bluetooth®. More generally, the client device 110 can be any suitable computing device such as a laptop computer, a tablet computer, a wearable device, etc.

The client device 110 can include a network interface 120 configured to communicate with the map data server 112 and other devices using any suitable protocols via the network 114. The client device 110 also can include a user interface 122 configured to receive typed input, gesture-based input, voice input, etc. and to display images, output audio, and generate haptic output for example. The user 122 in an example implementation includes a touchscreen. Further, the client device 110 can include one or more general-purpose processors 124, a non-transitory computer-readable memory 126, and a graphics card 128 (e.g., including one or more graphics processing units, or GPUs). The memory 126 can include persistent components (e.g., a hard disk) as well as non-persistent components (e.g., RAM). In other implementations, the client device 110 may include additional components or, conversely, not include some of the components illustrated in FIG. 1.

The geographic data server 112 can be a network server implemented as a single device or as a group of devices. One or more of these devices can include one or more processors 130 and a non-transitory computer-readable memory 132 that stores instructions executable on the one or more processors 130. These instructions can implement, among other software components, the offline data controller 102 as well as a network coverage module 140 and a location predictor 142. More generally, the geographic data server 112 can include any suitable type of processing hardware that implements the functionality of the modules 102, 140, and 142.

With continued reference to FIG. 1, the geographic data server 112 can be coupled to a geographic database 150, a network coverage database 152, a location history database 154, and a predicted destinations and padding database 156. Each of the databases 150, 152, 154, and 156 can be implemented in a single storage device or multiple storage devices.

The geographic database 150 can store map data that includes descriptions of geometry for various map features such as buildings and other structures, roads, parks, bodies of water, etc. Besides roads designed for vehicles, the map data can describe bicycle paths, pedestrian paths, railway paths, shipping routes, airlines routes, etc. Map features can be defined in a vector graphics format, according to which images are described in terms of geometrical primitives based on mathematical expressions, or another suitable scalable format. Depending on the implementation, map features can be defined in two dimensions (2D) only, in three dimensions (3D) as wireframes to which raster textures are applied, in "two-and-a-half" dimensions (2.5D) as 2D polygons "extruded" into the third dimension, etc. In some cases, map data also can include raster images in a bitmap format, for example. Further, map data also can include text label and various forms of metadata such as links to remote resources.

The geographic database 150 can store the map data in the format of map tiles that generally correspond to a 2D organization of geospatial data into a quadtree. Each tile at a given zoom level is divided into four tiles at the next level up to the highest level of magnification. Similarly, 3D organization of geospatial data can be implemented using octrees, in which a cubic volume contains map geometry at a certain zoom level and is subdivided into eight cubic volumes at the next zoom level, with each of the eight cubic volumes typically containing a more detailed map geometry. To map the surface of the Earth onto a plane for 2D representation, Mercator or another suitable projection can be used. Although the examples below refer to map data organized into 2D map tiles, these techniques also can be extended to 3D map data organized into octrees.

In an example implementation, the geographic data server 112 references regions in the geographic database 150 using S2 cells, which correspond to subsections of a unit sphere generated by projecting the sphere onto a cube. The level of an S2 cell indicates how much the sphere has been subdivided. There are $6*4^L$ S2 cells at level L. The geographic data server 112 also can reference regions in the geographic database 150 using Mercator tile coordinates, which are subsections of the unit sphere generated using a Mercator projection. The zoom of a tile coordinate indicates how much the sphere has been subdivided, and there are $4^Z$ Mercator tile coordinates at zoom level Z.

In addition to map data, the geographic database 150 can store point-of-interest (POI) data which can include geographic coordinates of various places. For some of the places, the geographic database 150 can store business data such as hours of operation, a description of products and services offered, user reviews, etc. The POIs need not always correspond to businesses and also can include landmarks (e.g., monuments, fountains), prominent buildings and other structures, locations of events, etc. Further, the geographic database 150 can store speech recognizer models that can be used to detect local queries, e.g., names of local POIs or other locally common phrases.

The network coverage database 152 can store indications of how much bandwidth is available at various locations, which can be referenced using S2 cells, Mercator tile coordinates, or in any other suitable manner. These indications can be specific to a carrier. An example of a network coverage table the network coverage database 152 can store is discussed below with reference to FIG. 10.

The prediction rules database 154 can store rules for predicting likely destinations for various locations, which can be approximated using S2 cells for example. For example, when the client device is located on an interstate highway, a prediction rule can predict that the client device likely will continue to travel on the interstate highway and not turn on rural roads. Another example prediction rule the location predictor 142 can apply is that a user device located near a country border is unlikely to cross the border, especially when the client device is not nearby an official border crossing. Further, the database 154 can store prediction rules based on observations for large sets of users. For example, a prediction rule can be based on the observation that users tend to move between certain locations and tend to not travel to other locations. Still further, prediction rules can be based both on the current location and a certain number recent prior locations, so that the location predictor 142 can determine in which direction the user device is headed on a highway, for example. Thus, for the same location, the location predictor 142 can provide one set of predicted destinations when the user device is headed in one direction but a different set of predicted destinations when the user device is headed in the opposite direction. Yet another prediction rule can be that the location predictor 142 omits regions to which there no roads, and which accordingly are not reachable by vehicles.

Still referring to FIG. 1, the memory 126 of the client device 110 can store instructions that implement various software applications such as a geographic application 160. The geographic application 160 can generate interactive digital maps, obtain navigation directions, provide data related to geolocated businesses in response to geographic queries, retrieve and display geographic commercial data such as coupons and offers, etc. Depending on the implementation, the geographic application 160 can operate as a standalone application or as a component of another application such as a web browser, for example.

The memory 126 of the client device 110 also can store map tiles 162 that include geographic data for one or more geographic areas of offline coverage. Further, the memory 126 can store check-in bounds 164, or an indication of a geographic boundary delimiting a region inside a geographic area of offline coverage. Additionally or alternatively, the memory 126 can store check-in bounds that are based on time rather than geography. Time-based check-in bounds can delimit time intervals during which the client need not request additional geographic data. As discussed in more detail below, the offline data manager 104 operating in the client device 110 can request additional geographic data to expand the geographic area of offline coverage upon reaching the check-in bounds 164.

In some implementations, the offline data controller 102 pre-computes predicted destinations and padding for various geographic locations and stores the pre-computed data in the database 156. Examples of predicted destinations the database 156 can store are discussed below with reference to FIG. 8, and an example padding table the database 156 can store is discussed below with reference to FIG. 10.

In operation, the client device 110 requests geographic data for potential offline use from the geographic data server 112 under some specific conditions, and the geographic data server 112 in response provides geographic data to the client device 110, selected so as reduce the probability the geographic application 160 is unable to display a geographic map via the user interface 122 due to insufficient network coverage. When the client device 110 operates in the offline mode, the geographic application 160 can use the map tiles 162 and/or other offline geographic data received from the server 112 to generate offline maps, display information about businesses, provide navigation directions, service geographic queries based on typed input or voice input (using one or more speech recognized models received from the server 112), etc. Operation of the offline management system in various scenarios is discussed in more detail next with reference to FIGS. 2-16C.

Figure 2:
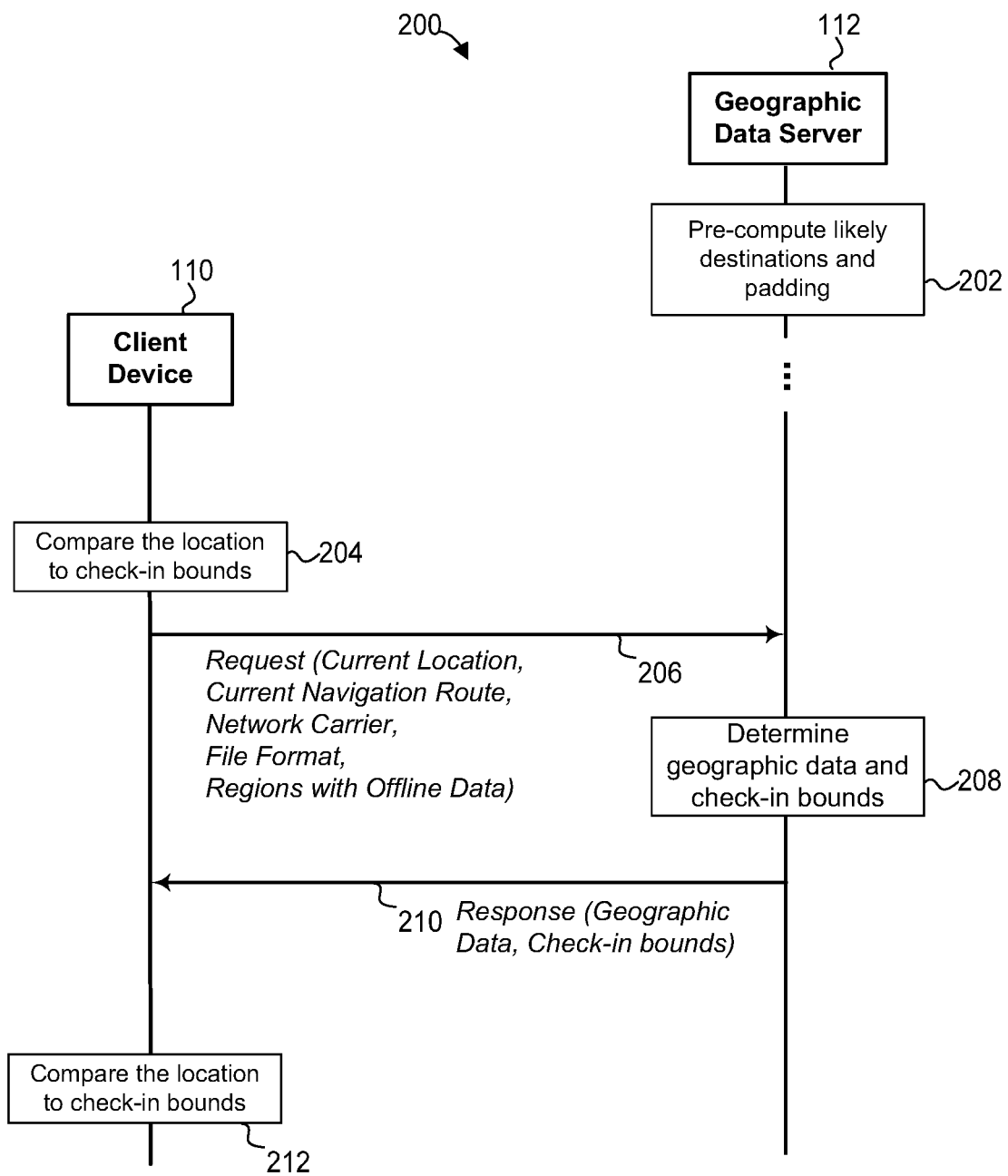
FIG. 2 is a messaging diagram of a scenario in which a client device requests geographic data for potential offline use from a geographic data server.

Referring first to FIG. 2, a diagram 200 illustrates example messaging between the client device 110 and the geographic data server 112 in the scenario where the client device 110 requests geographic data from the geographic data server 112 for potential offline use. Unlike an interaction during which the client device 110 requests map data for a specific geographic area, such as when the user types in "Los Angeles, Calif." or positions the map viewport over Los Angeles, Calif., here the client device 110 does not request geographic data for a specific geographic region, and the geographic data server 112 determines which geographic the client device is likely to need in the future.

To service such requests from the client device 110 and similar client devices more efficiently, the geographic data server 112 can pre-compute predicted destinations and padding information at block 202. Depending on the implementation, the geographic data server 112 can execute block 202 daily, weekly, or according to any other suitable schedule.

The client device 110 compares its current location to the check-in bounds at block 204. When the current location is outside the check-in bounds or within some threshold distance from the check-in bounds, the client device 110 can transmit a request 206 to the geographic data server 112. When the check-in bounds are time-based, the client device 110 can check whether a sufficient amount of time has passed since the client device 110 last determined whether it should request additional geographic data for potential offline use. The client device 110 in some implementations can check both the check-in bounds based on geography and the check-in bounds based on time. In this manner, even when the client device 110 is not outside the geographic check-in bounds, the client device can request new geographic data if the age of the geographic data currently stored in the local memory has exceeded a threshold number of hours, days, weeks, etc. Further, the geographic data server 112 in some cases can provide the client device 110 with time-based check-in bounds to simplify the check-in logic at the client device 110, as it is generally easier to check a time interval than to determine whether a point is outside a shape, especially a complex shape. If the client device 110 has not yet received the check-in bounds from the geographic data server 112, the client device 110 can set the check-in bounds to an initial value such as the minimal radius around the current location of the client device, so that transmission of the request 206 is triggered immediately.

The request 206 can include an indication of the current location of the client device 110 in the form of Global Positioning Service (GPS) coordinates, for example. The request 206 can include an indication of the navigation route the client device 110 is following. Further, the request 206 can include an indication of the network carrier, so that the geographic data server 112 can determine the amount of padding more accurately. This indication can include a mobile country code (MCC) and a mobile network code (MNC) tuple, or any other suitable information for identifying the network carrier. Still further, the request 206 can include an indication of the desired format of the geographic data. In general, client devices can support different binary formats of the raster map tiles, vector map tiles, search results, routing information, etc. Moreover, the request 206 can include an indication of the regions for which the client device 110 already stores offline geographic data in the local memory (e.g., the memory 126 of FIG. 1).

The geographic data server 112 then can determine the extent of the geographic area of offline coverage for the client device 110 in view of the parameters specified in the request 206, as well as the map tiles that the geographic data server 112 must provide to the client device 110 to cover this area (block 208). To this end, the geographic data server 112 can query the database 156 to determine the predicted destinations and the padding. The geographic data server 112 also determines the new check-in bounds.

The geographic data server 112 then initiates the process of providing the geographic data and the check-in bounds to the client device 110 via a sequence of responses 210. In one example implementation, the initial response from the geographic data server 112 includes a list of URLs or other references to portions of the geographic data to be downloaded along with the check-in bounds. Because the geographic data server 112 may need to provide a relatively large amount of information (e.g., X MB) in response to the request 206, the location of the client device 110 can change significantly during the time it takes to transfer X MB over the communication network. The geographic data server 112 accordingly determines the check-in bounds so that the client device 110 requests the geographic data so as to finish the retrieval of the offline geographic data before reaching any of the edges of the geographic area of offline coverage. The client device 110 can continue to compare its location to the check-in bounds, during the process of receiving geographic data and after the process completes, as illustrated in block 212.

Figure 3:
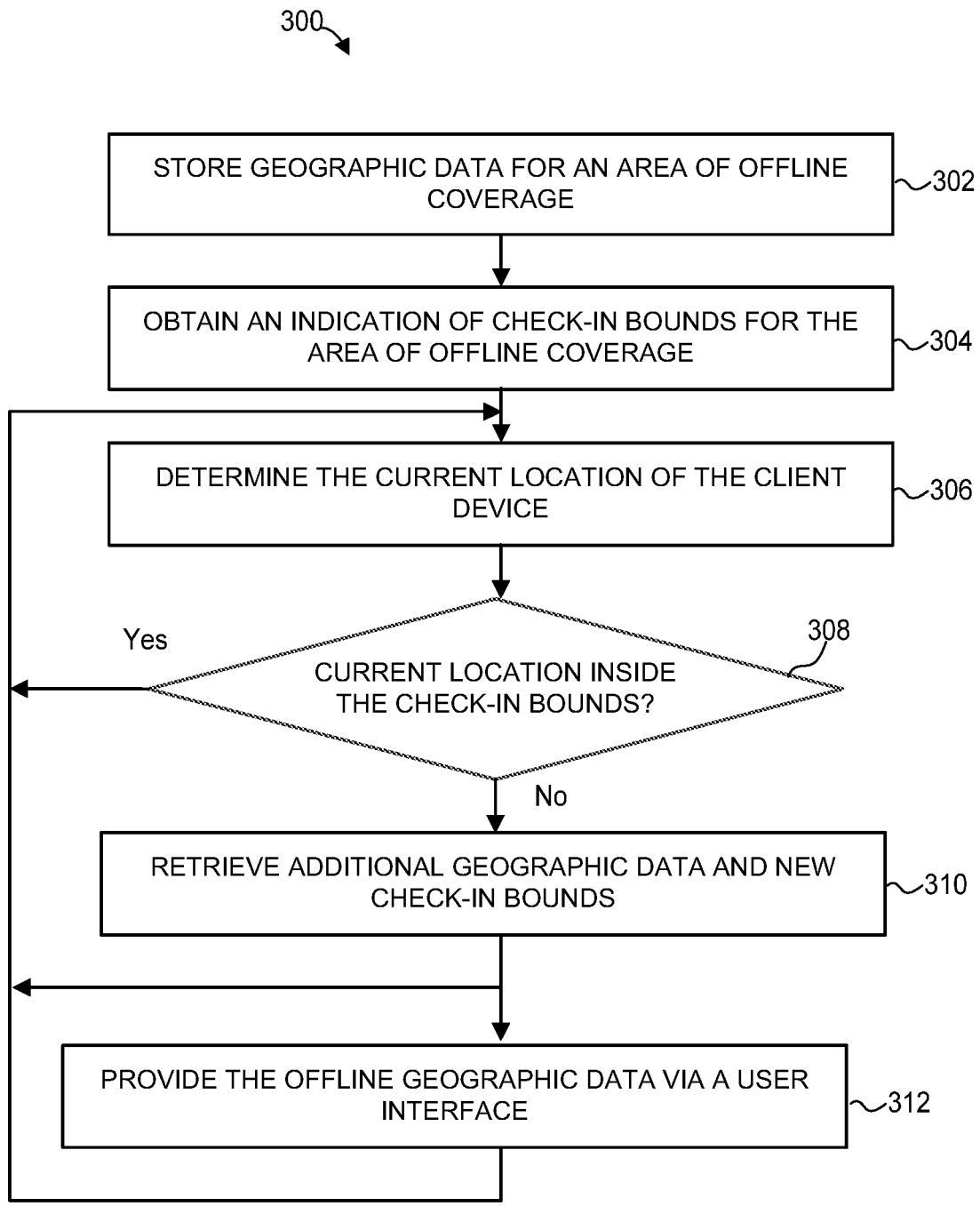
FIG. 3 is a flow diagram of an example method for obtaining geographic data from a geographic data server for potential offline use, which can be implemented in the client device operating in the system of FIG. 1.

For further clarity, FIG. 3 illustrates an example method 300 for obtaining geographic data from a geographic data server for potential offline use, which can be implemented in a suitable client device. For example, the offline management system can implement the method 300 in the client-side component, e.g., the offline data manager 104.

The method 300 begins at block 302, where the offline data manager 104 stores geographic data for an area of offline coverage in the memory of the client device. The offline data manager 104 can store the geographic data in the form of map tiles, for example.

At block 304, the offline data manager 104 can obtain an indication of the current check-in bounds for the area of geographic coverage. The check-in bounds generally delimit a region smaller than, and wholly contained within, the area of geographic coverage. Referring to FIG. 12A, for example, the check-in bounds 1202 delimit a region inside the larger geographic area of offline coverage 1200.

The offline data manager 104 determines the current location of the client device at block 306 and, at block 308, determines whether the current location is within the check-in bounds. If the current location is within the check-in bounds, as is the case in FIG. 12A, for example (where the current location of the client device is represented by a location indicator 1204), the flow returns to block 306. The flow may return to block 306 after a certain time interval, so that the offline data manager 104 periodically tests the current location against the check-in bounds. The time interval in some implementations can depend on the current speed of the client device. Thus, the offline data manager 104 tests the current location against the check-in bounds relatively frequently when the client device is moving fast, and tests the current location against the check-in bounds relatively infrequently when the client device is moving slowly. Otherwise, if the current location is outside the check-in bounds or sufficiently close to the check-in bounds (see the location 1204-2 in FIG. 12B, for example), the flow proceeds to block 310.

At block 310, the offline data manager 104 can retrieve additional geographic data and the new check-in bounds. To this end, the offline data manager 104 can transmit the message 206 as illustrated in FIG. 2. The geographic data server accordingly can respond with a set of responses 210.

In some cases, the client device provides the offline geographic data via the user interface at block 312. For example, the user can request a digital map of a location within the geographic area of offline coverage, submit a geographic query, etc. As another example, the geographic application 160 can display the digital map to illustrate a navigation route. In general, block 312 can be executed at any time during execution of the method 300, or block 312 can be executed as a part of a separate process independent of the method 300.

Figure 4:
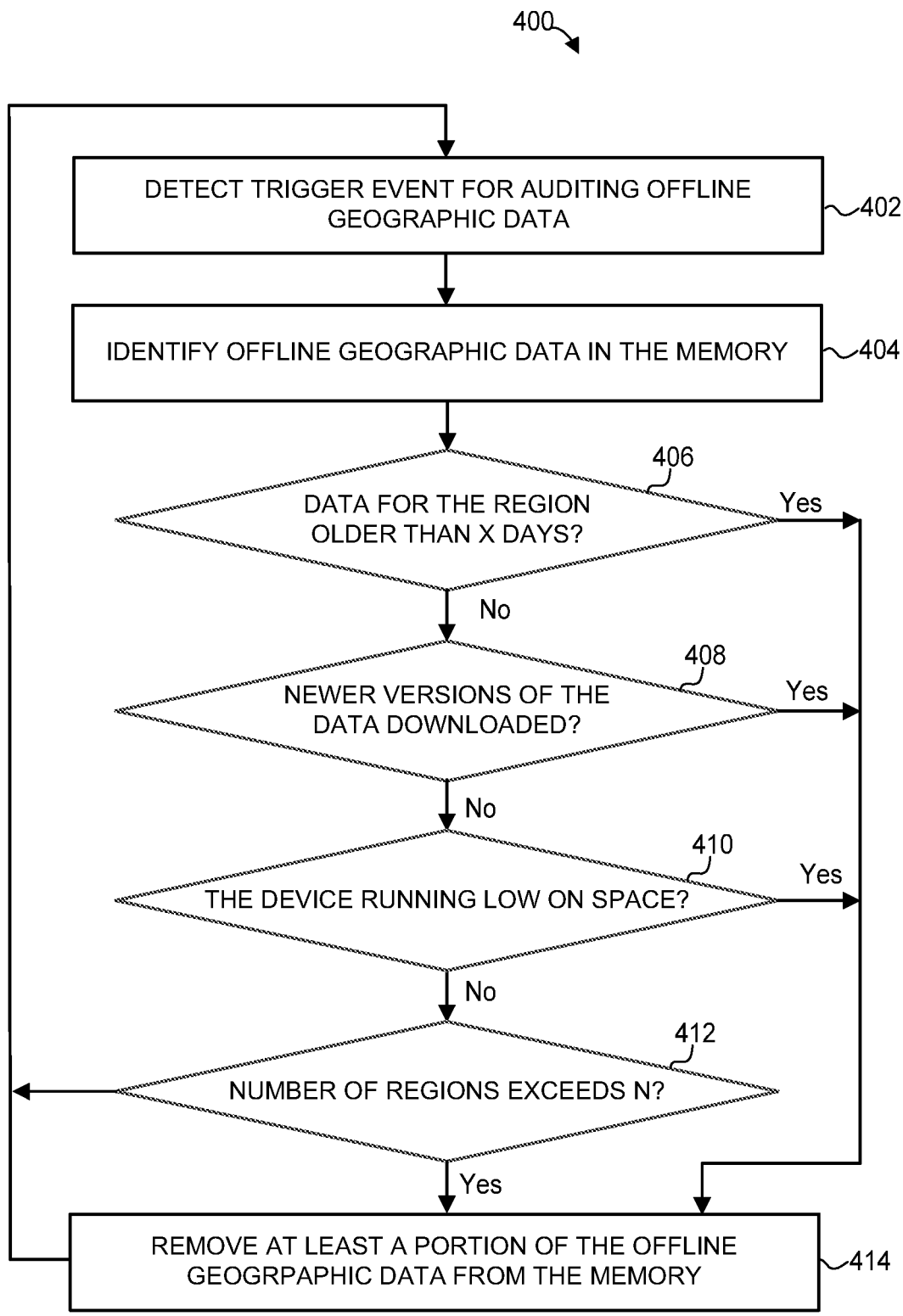
FIG. 4 is a flow diagram of an example method for removing offline geographic data from the local memory, which can be implemented in the client device operating in the system of FIG. 1.

Now referring to FIG. 4, the offline data manager 104 also can audit the offline geographic data to remove some of the data and thus prevent the geographic data from occupying an excessive portion of the local storage of the client device 110, which may be implemented in the persistent portion of the memory 126.

The method 400 begins at block 402, where a trigger event for auditing (or "garbage-collecting") the offline geographic data is detected. In one example implementation, the trigger event is retrieval of new geographic data, e.g., transmittal of the request 206 or receipt of one or more responses 210 (see FIG. 2). The trigger event alternatively can be the expiration of a periodic timer. As yet another alternative, the trigger event can be a command the offline data controller 102 issues upon detecting a certain condition, such as a request to download a certain amount of geographic data. The offline data manager 104 identifies the offline geographic data currently stored in the memory at block 404. Then, at blocks 406-412, the offline geographic data can attempt to identify portions of the offline geographic data that can be removed with a minimal risk of failing to provide the user with a digital map of a certain area upon request. Blocks 406-412 can be executed in any desired order.

The checks and tests the offline data manager 104 executes at blocks 406-412 can include checking whether the data for a certain region is older than X days, where X can be 30, 90, 365, or any suitable number (block 406); whether new versions of the data covering a certain region have been downloaded (408); whether the client deice is running low on memory (block 410); whether there are more than N regions of offline geographic data stored in the memory of the client device (block 412). The offline data manager 104 can enforce the condition of block 412 because the performance of the client device can degrade when the amount of offline geographic data in the memory is large. Additional examples of checks and tests the offline data manager 104 can execute to determine whether certain offline geographic data should be removed is how recently the geographic application 160 used this data to display a digital map, provide search results, provide navigation, etc. Upon determining how recently certain data was used, the offline data manager 104 can first remove the less-recently used data. Further, in some implementations, the offline data controller 102 can assist the offline data manager 104 in determining which offline geographic data should be removed from the memory.

At block 414, the offline data manager 104 can remove the old or superseded data when one of the conditions of blocks 406 or 408 is satisfied, or remove the least recently used region when one of the conditions of blocks 410 or 412 is satisfied.

Alternatively, the offline data manager 104 can determine that the data recognized as being old at block 406 should be used as backup in the event the client device fails to download new data. Moreover, the offline data manager 104 can request that the geographic data server provide a description of the difference between the map tiles corresponding to the old version and the map tiles corresponding to the new version, instead of sending the map tiles corresponding to the new version in their entirety, to reduce the amount of data transmitted via the communication network. The offline data controller 102 can calculate a "diff" raster image, a diff vector-based map tile, or any other suitable description of the difference between the versions already downloaded to the client device 110 and available for download, for the region or for a nearby area.

Figure 5:
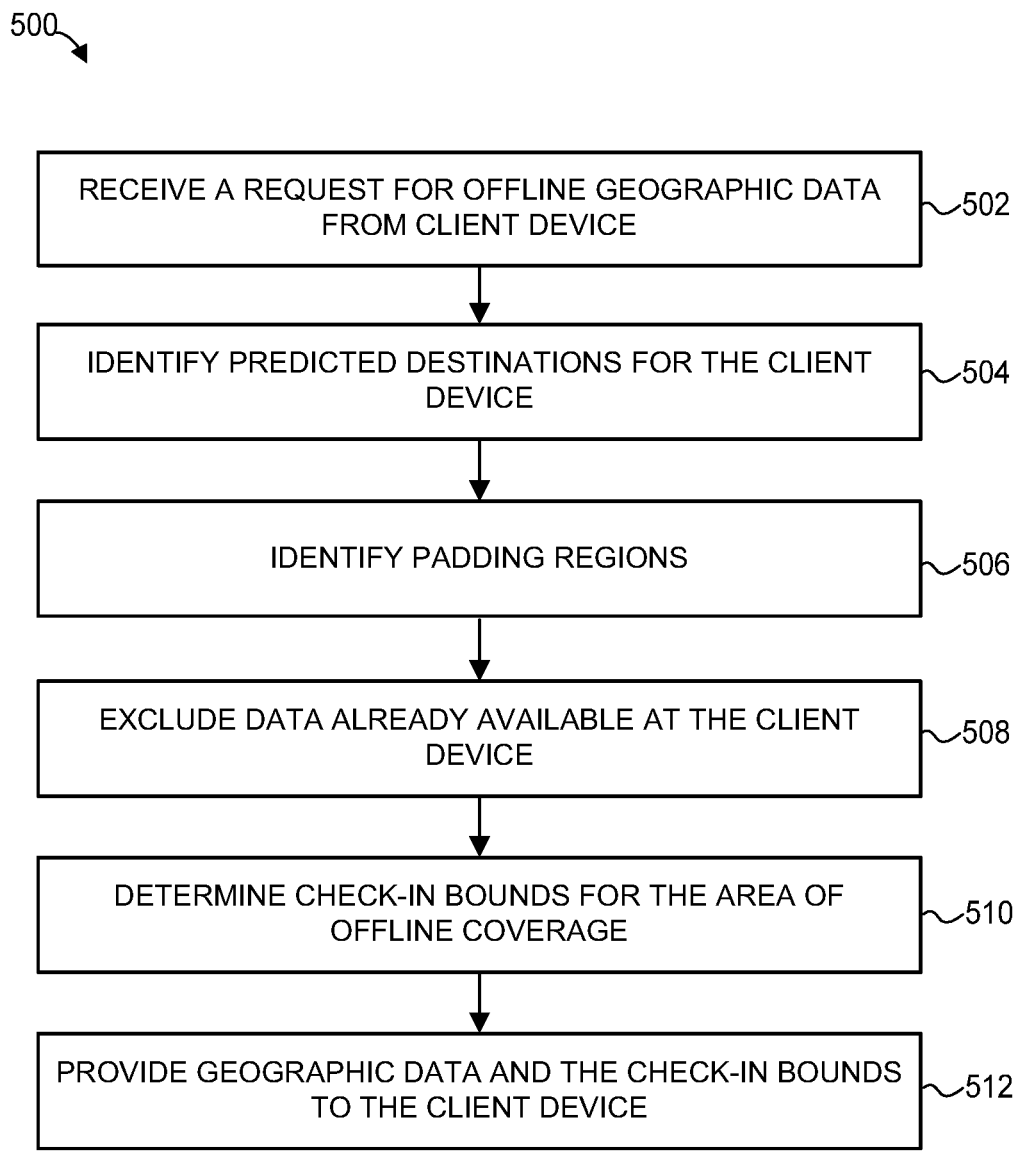
FIG. 5 is a flow diagram of an example method for determining offline geographic data and a boundary of a region of sufficient offline coverage, which can be implemented in the map data server operating in the system of FIG. 1.

FIG. 5 illustrates an example method 500 for determining geographic data and a boundary of a region of sufficient offline coverage. The offline management system can implement the method 500 in the server-side component, e.g., the offline data controller 102. The method 500 is considered next in connection with the diagrams in FIGS. 6-10.

At block 502, the offline data controller 102 can receive a request for offline geographic data from a client device. The offline data controller 102 for example can receive the message 206 including some or all of the parameters listed in FIG. 2, as discussed above. Thus, the offline data controller 102 receives an indication of the current location of the client device, an indication of the network carrier, etc.

Next, at block 504, the offline data controller 102 can identify predicted destinations for the client device. When the client device identifies a navigation route in the request 206 (see FIG. 2), the offline data controller 102 can determine that the entire area within X km of the navigation route corresponds to the likely destinations for the client device, and accordingly the offline data controller 102 can select map tiles covering this entire area at a certain zoom level. This example scenario is further illustrated in FIGS. 16A-C. When the length of the navigation route exceeds a certain threshold value, the offline data controller 102 can select map data for the area within X km of only the first Y km of the navigation route.

When the client device does not specify a navigation route, the offline data controller 102 can rely on the location predictor 142 to determine locations to which the client is likely to travel, based on the aggregate historical data for a set of users. The location predictor 142 for efficiently can pre-compute this information and then retrieve the pre-computed predicted destinations from the database 156. As a more specific example, the offline data controller 102 can determine to what cells (rather than points or particular coordinates) the user device is likely to travel given the cell in which the user device currently is located.

Figure 6:
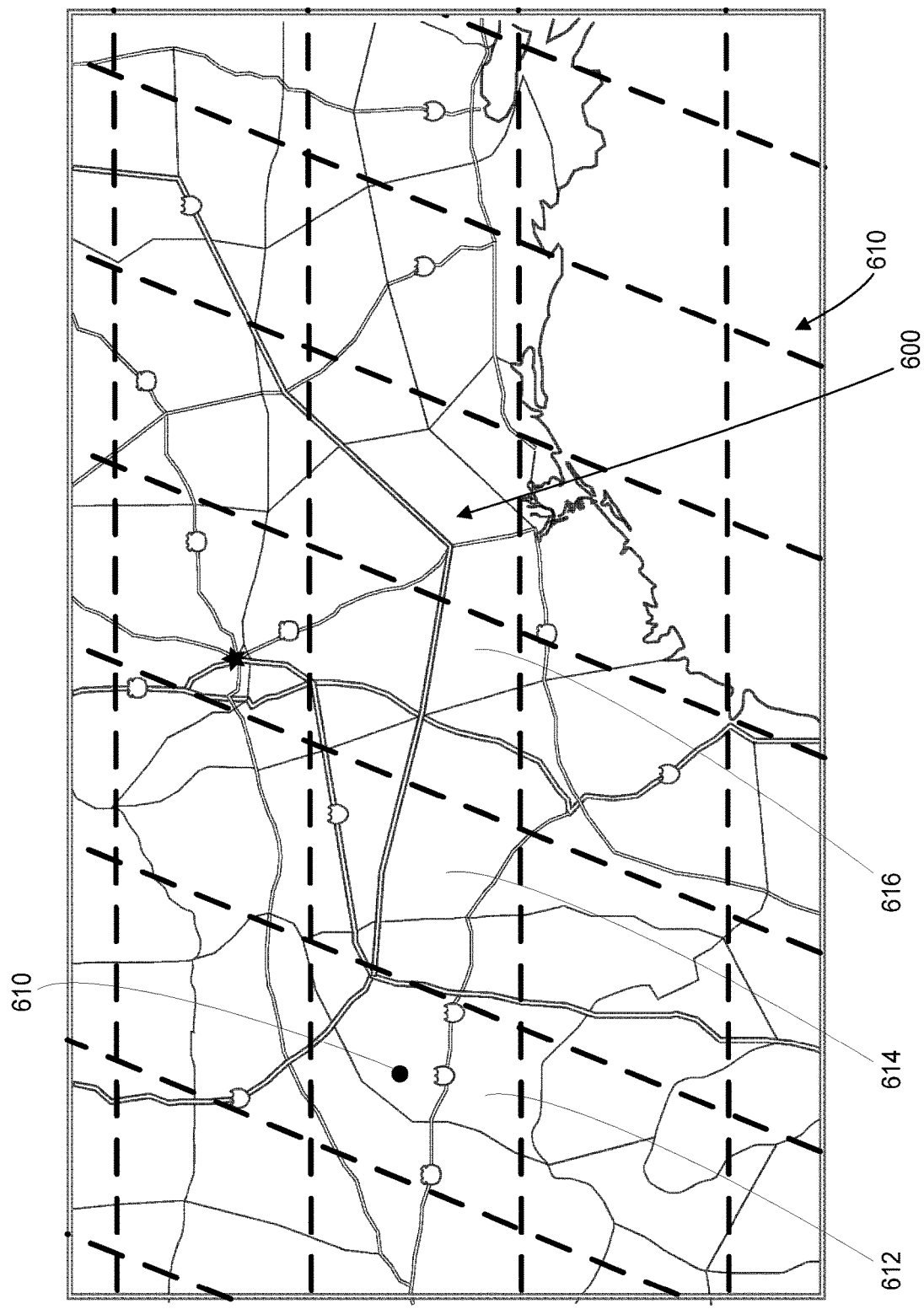
FIG. 6 illustrating example application of S2 cells to a geographic area.

Referring to FIG. 6, for example, a geographic area 600 can be divided into a grid 610 of S2 cells 612, 614, 616, etc. Each cell at a particular level can cover a region of a certain fixed size. The example current location 610 of the client device is within cell 602.

Figure 7:
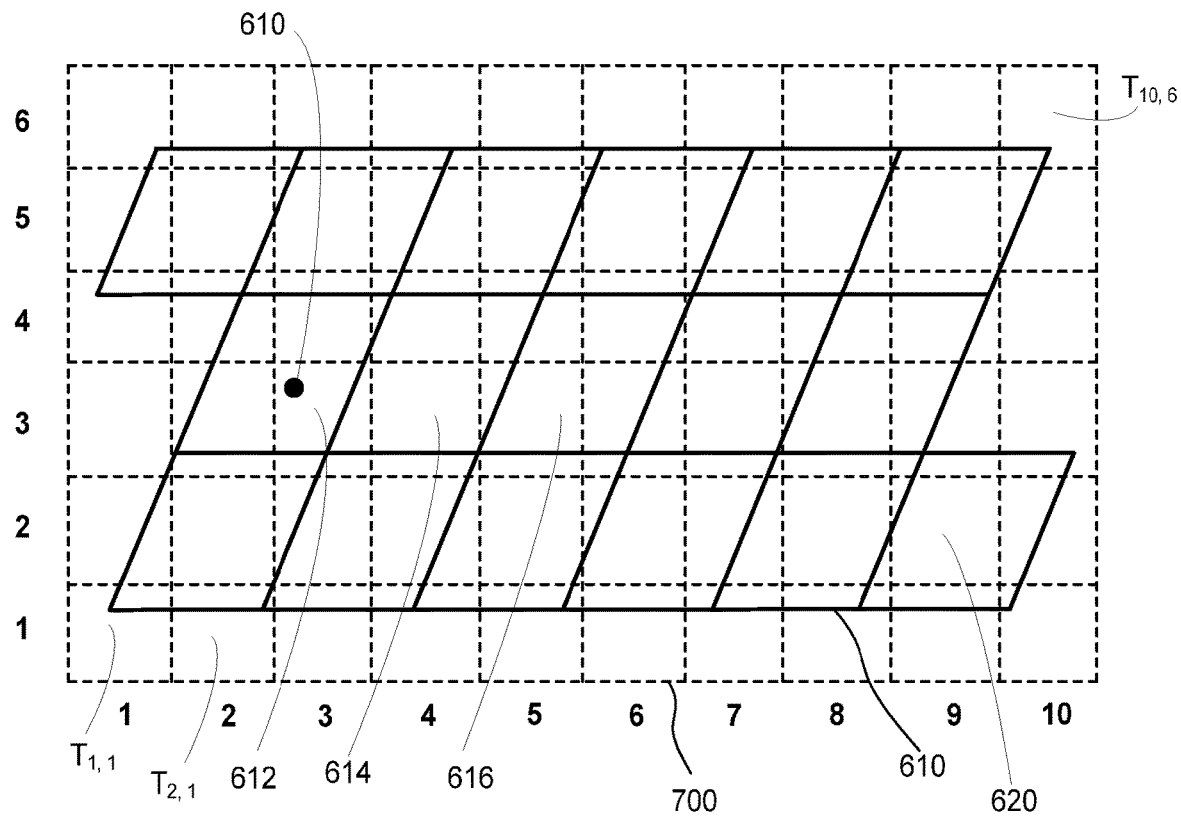
FIG. 7 illustrates an example relationship between S2 cells and map tiles used to generate digital maps.

As illustrated in FIG. 7, the grid 610 of S2 need not correspond to map tiles into which the corresponding geographic data is divided. For example, a grid 700 of map tiles at a certain zoom level Z includes tiles $T_{1,1}$, $T_{1,2}$, ... $T_{10,6}$, where each tile has an x-coordinate and y-coordinate. Thus, as illustrated in FIG. 7, the example cell 612 overlaps map tiles $T_{2,3}$, $T_{3,3}$, $T_{2,4}$, and $T_{3,4}$. The map tiles $T_{2,3}$, $T_{3,3}$, $T_{2,4}$, and $T_{3,4}$ can correspond to Mercator tile coordinates.

Figure 8:
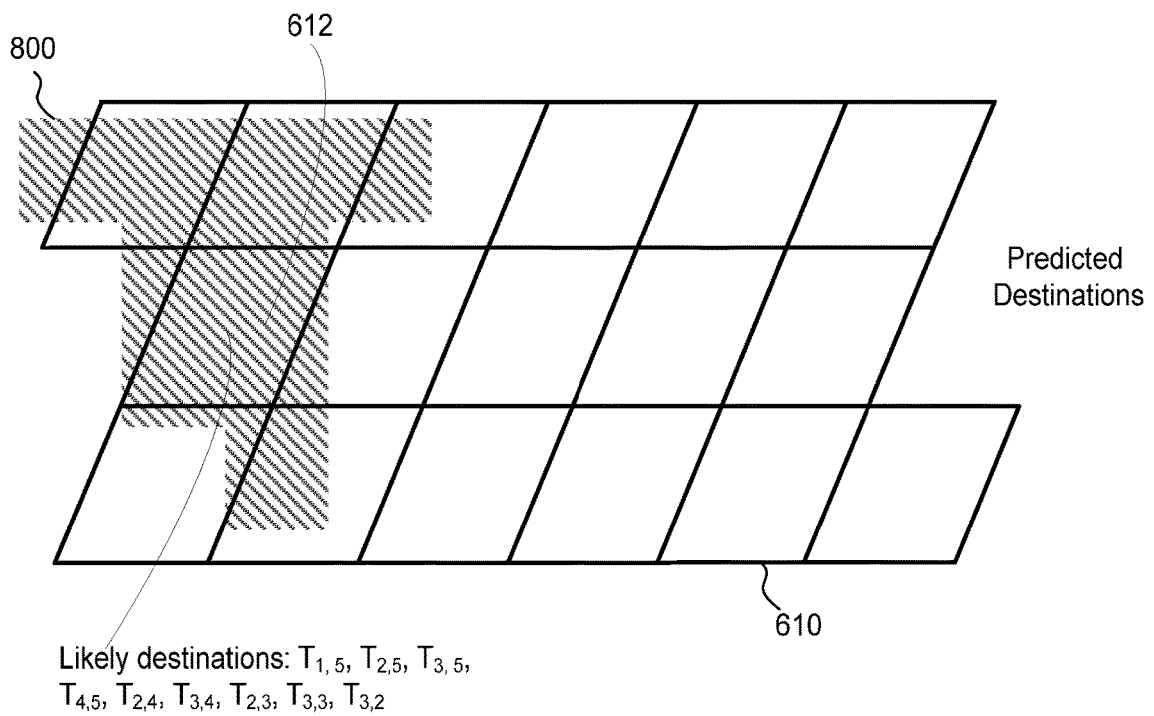
FIG. 8 schematically illustrates an example listing of map tiles corresponding to predicted destinations for a certain S2 cell, which the offline management system of FIG. 1 can use to identify offline geographic data to be provided to a client device.

FIG. 8 illustrates an example predicted set 800 of map tiles which the location predictor 142 can generate for the example cell 612. Generally speaking, the location predictor 142 can determine where the client device is likely to be in X hours given the current location of the client device. The predicted set 800 is made up of tiles from the grid 700 of FIG. 7: in this example, the predicted set 800 includes tiles $T_{1,5}$, $T_{2,5}$, $T_{3,5}$, $T_{4,5}$, $T_{2,4}$, $T_{3,4}$, $T_{2,3}$, $T_{3,3}$, and $T_{3,2}$. Each of these tiles covers a region to which the client device located in the cell 612 is likely to travel. Thus, the predicted set 800 approximates the predicted geographic area for the cell 612. To identify the regions that make up the predicted destinations area represented by the predicted set 800, the location predictor 142 of FIG. 1 can apply a set of prediction rules, as discussed above with reference to the database 154. When the location predictor 142 is unable to apply a suitable rule, the location predictor 142 can simply select map tiles within a certain radius of the current location of the client device.

Figure 14A:
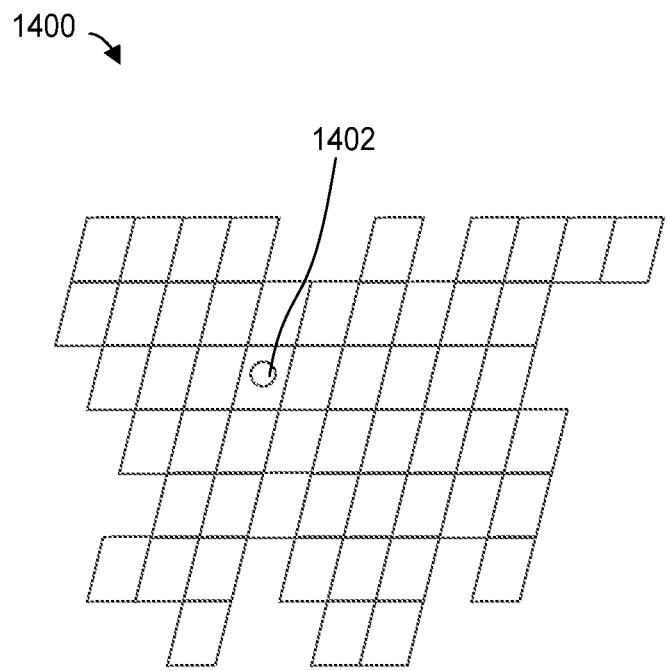
FIGS. 14A and 14B schematically illustrate an example scenario in which the server of FIG. 1 generates a Mercator covering for a set of S2 cells corresponding to predicted destinations of the client device.
Figure 14B:
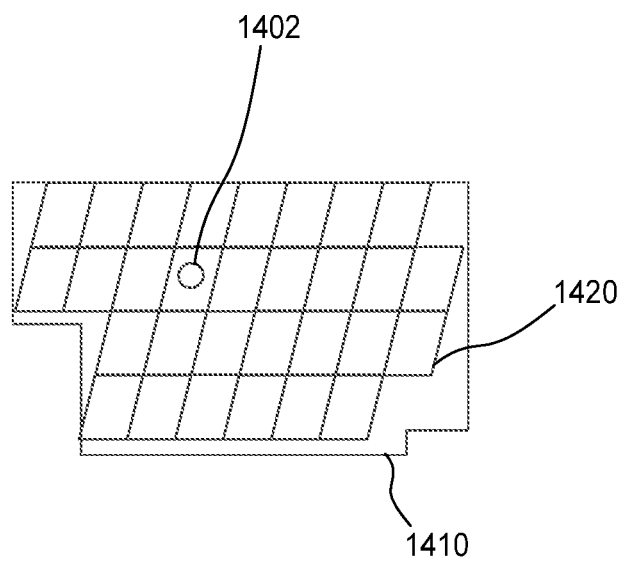

The predicted destinations and padding database 156 can store a mapping of S2 cells to sets of tile coordinates, e.g., cell 612-->{$T_{1,5}$, $T_{2,5}$, $T_{3,5}$, $T_{4,5}$, $T_{2,4}$, $T_{3,4}$, $T_{2,3}$, $T_{3,3}$, $T_{3,2}$} using tables, lists, trees, or any other suitable data structures. In some implementations, the database 156 also stores scores for each map tile, where the scores indicate the likelihood of the map tile being useful. The location predictor 142 in some cases applies a score filter to the predicted destinations area 800 to reduce the number of tiles, as illustrated in FIGS. 14A and 14B, for example.

Referring back to FIG. 5, at block 506 the offline data controller 102 can identify padding regions for the tiles in the predicted destinations area. Generally speaking, the offline data controller 102 determines padding regions for various locations to account for the displacement of the client device relative to the predicted geographic area while the client device is downloading the corresponding geographic data. For example, if the predicted set 800 of map tiles takes up 100 MB, and the client device can download on average 10 MB per minute while traveling at 60 miles per hour, the client device travels 10 miles before the 100 MB download is complete. If the geographic area of offline coverage coincides with the predicted destinations area covered by the predicted set 800 of map tiles, the client device is 10 miles closer to the edge of the geographic area of offline coverage upon completing the download. At this new location, the client device may need to download additional geographic data, but if the quality of the available network coverage is poor, the client device may be past the "point of no return," or the point at which the client device needs to download more data than it has the bandwidth and the time to download before reaching the edge of the geographic area of offline coverage.

Thus, the offline data controller 102 ensures that the client device downloads geographic data for an area large enough so that when the client device requests additional geographic data, the client device will continue to have network coverage while downloading the additional geographic data. The offline data controller 102 determines the padding region for a location as a set of all points that can be reached from the location before X MB can be downloaded, where X MB is the size of the data covering the region that would be downloaded at the location. Once the offline data controller 102 augments the predicted destinations area with the padding regions for all locations in the predicted destinations area, the resulting area of offline coverage has the property that all the points within the predicted destinations area are before the point of no return.

Figure 11:
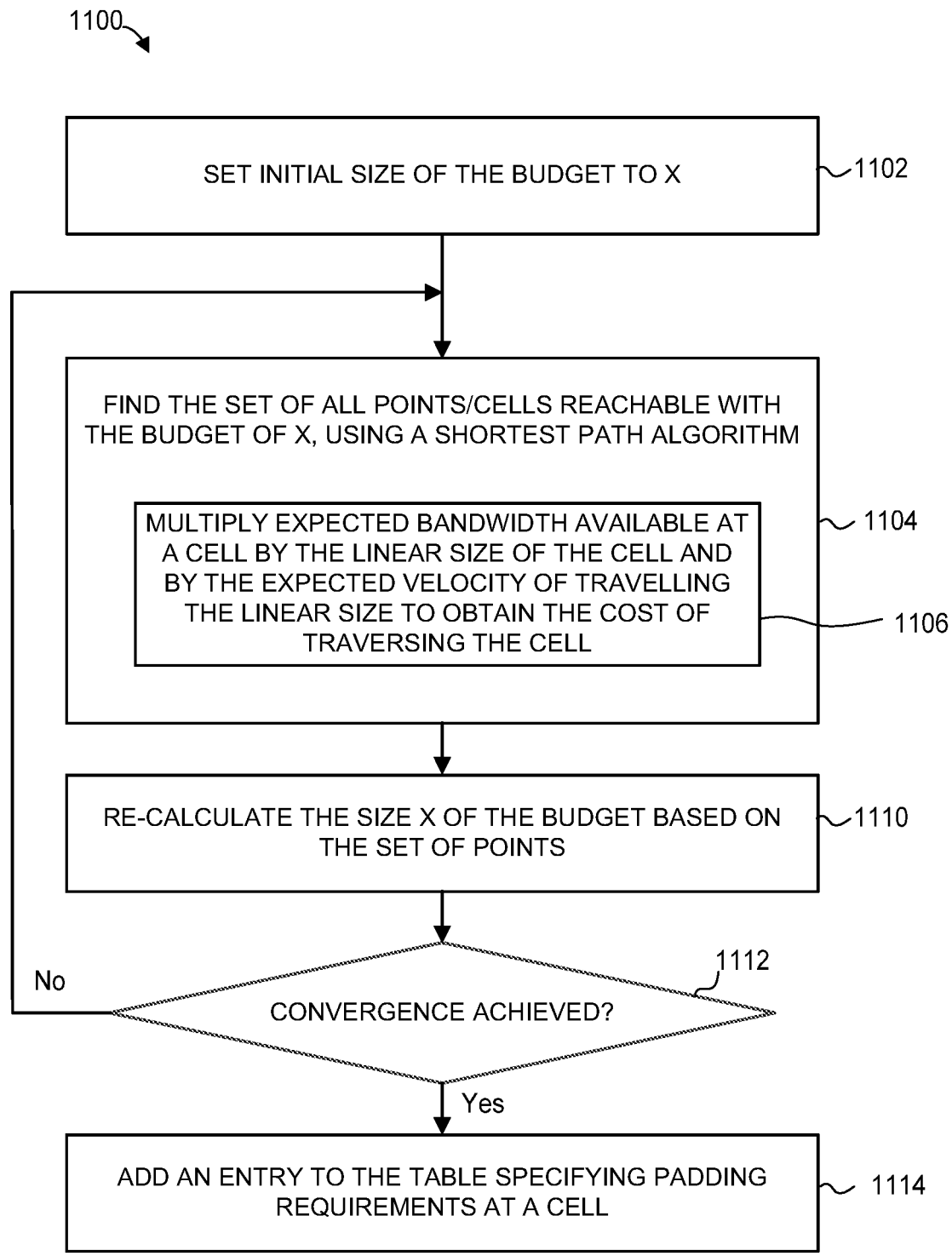
FIG. 11 is a flow diagram of an example method for computing offline padding requirements for geographic cells, which can be implemented in the map data server operating in the system of FIG. 1.

An example iterative technique for determining offline padding requirements for geographic cells is considered in detail with reference to FIG. 11. To implement this iterative technique, the offline data controller 102 can use a data structure 900 schematically illustrated in FIG. 9, which stores indications of bandwidth for various S2 cells and various network carriers. Thus, for example, the data structure 900 can indicate that network carrier C1 provides approximately 5 Mbps at cell 612, and that at cell 620, network carriers C1, C2, and C3 provide approximately 10 Mbps, 5 Mbps, and 7 Mbps, respectively.

Using the method of FIG. 11 or another suitable technique, the offline data controller 102 can generate an example mapping 1000 that provides, for various map tiles and network carriers, lists of map tiles to be used as padding regions. Thus, according to the mapping 1000, the padding region for tile $T_{4,3}$ is tiles $T_{2,2}$ and $T_{3,2}$ when network carrier C1 is used, and $T_{2,2}$, $T_{3,2}$, $T_{2,3}$, $T_{4,4}$ when network carrier C2 is used. At block 506, the offline data controller 102 can look up the padding regions for all the tiles included in the predicted set 800 corresponding to the predicted destinations area.

Figure 12C:
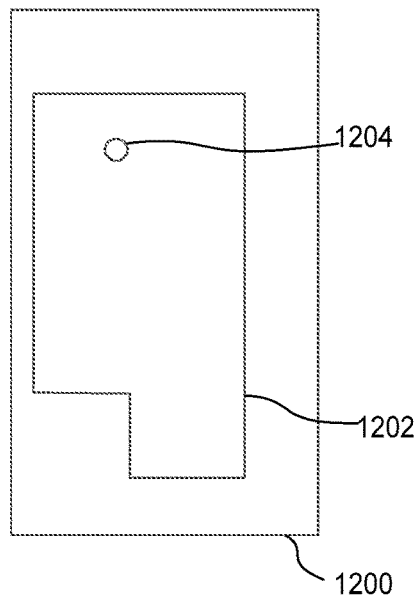
Figure 12C:
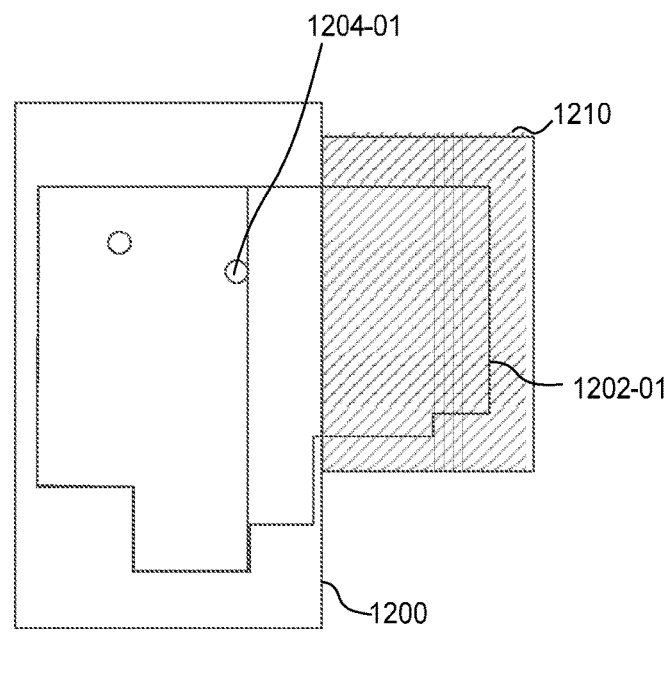
Figure 12C:
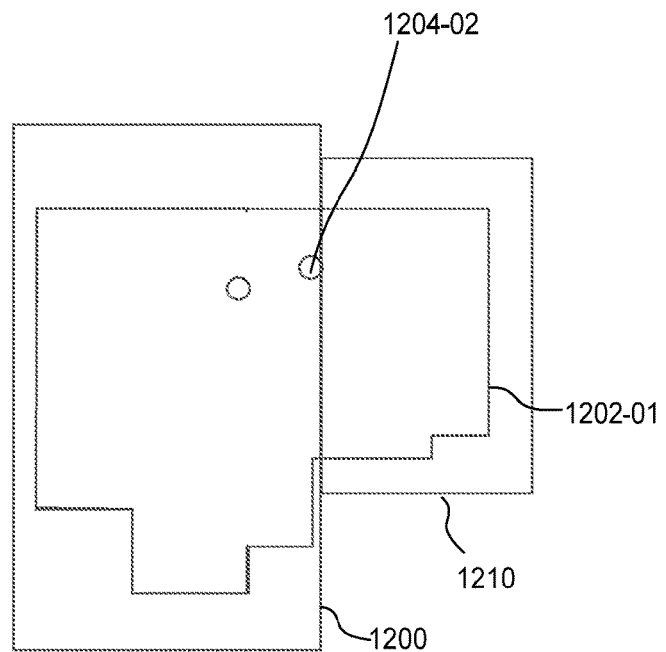

At block 508, the offline data controller 102 excludes the offline data already available at the client device from the expanded region that includes the predicted destinations area determined at block 504 and the padding regions determined at block 506. As discussed above, the client device can report the already-available offline geographic data as a part of the request 206 (see FIG. 2). An example exclusion of already-available offline data is schematically illustrated in FIG. 12C.

In some implementations, the geographic data server 112 frequently updates the data in the geographic database 150, but the changes are relatively small. To preserve the bandwidth, the offline data controller 102 can determine whether the version of certain geographic data is sufficiently close to the version of the same geographic data available at the client device, when the versions are not identical. When the versions are sufficiently close, the offline data controller 102 excludes this data from download. The offline data controller 102 can apply one or several heuristics to compare versions such as for example determining whether the map tile language, the legal country, and the styling for application to the vector data in the corresponding map tiles match. Another example heuristic can include determining whether the routing versions (provided defined from map tile versions) are identical. Yet another example heuristic can include determining whether the search language matches and the search versions (also defined separately from map tile versions) differ from each other by no more than X days (e.g., 14 days).

Next, at block 510, the offline data controller 102 determines the check-in bounds for the area of offline coverage. The offline data controller 102 first identifies the set of all data that has been or soon will be downloaded the client, i.e., the data that corresponds to the geographic area of offline coverage at the client device. The offline data controller 102 then erodes, or reduces along the perimeter the geographic area of offline coverage so that the client device never reaches the point of no return. Because the offline data controller 102 has already determined the padding regions, the offline data controller 102 can associate the check-in bounds with the boundary of the predicted destinations area. Thus, the check-in bounds for a region contain all the points for which the padding is contained in the region.

As one example, when the client device operates in a vehicle driving into a mountain range without coverage, the client device should start downloading the entire area without coverage sufficiently early so that the client device completes the download before losing network connectivity. The offline data controller 102 accordingly provides the check-in bounds that trigger an early start of a download.

At block 512, the offline data controller 102 provides the geographic data and the check-in bounds to the client device. Referring back to FIG. 2, the geographic data server in which the offline data controller 102 operates can send the response 210 to the client device.

In some implementations, the offline data controller 102 prioritizes the geographic data being downloaded to a client device based on relevance to advanced safety features, for example, and/or how essential different types of geographic data are to navigation (e.g., gas and food can be prioritized over landmarks). In this manner, if the client device reaches a point of no return, the client device still may have essential geographic data in the local memory.

Further, when the offline data controller 102 determines that a large amount of geographic data for a large geographic region should be downloaded to the client device, the offline data controller 102 can split the data into portions and prioritize the download based on proximity of the portions to the client device.

Now referring to FIG. 11, an example method 1100 for computing offline padding regions for geographic cells can be implemented in the offline data controller 102. The offline data controller 102 can execute the method 1100 periodically in a batch mode for a certain number of cells, prior to receiving requests from client devices. In other implementations or scenarios, however, the offline data controller 102 executes the method 1100 in real time upon receiving a request from a client device. The method 1100 generally is based on an iterative technique in which the steps of identifying locations reachable on a certain "budget" of data can impact on the budget, and some of the steps of the method 1100 are repeated until the values representing the amount of data required to cover the region and the budget converge.

At block 1102, the offline data controller 102 sets the initial size of the budget 1100 to X. For example, when a client device at a certain location does not yet have any offline geographic data, the initial size of the budget 1100 can be the cumulative size of the predicted set 800 of map tiles (see FIG. 8). The units of X can be for example megabytes or MB.

Next, at block 1104, the offline data controller 102 finds the set of all points reachable with the budget of X. The offline data controller 102 in general can apply any desired level of granularity for the set of points. In an example implementation, each of the S2 cells is associated with a single location (e.g., the centroid of the cell or a point in the S2 cell accessible by a road). The offline data controller 102 can apply Dijkstra's algorithm, a modification of the Dijkstra's algorithm, or any suitable shortest-path algorithm to find a shortest path from the current location of the client device to the various points.

Figure 9:
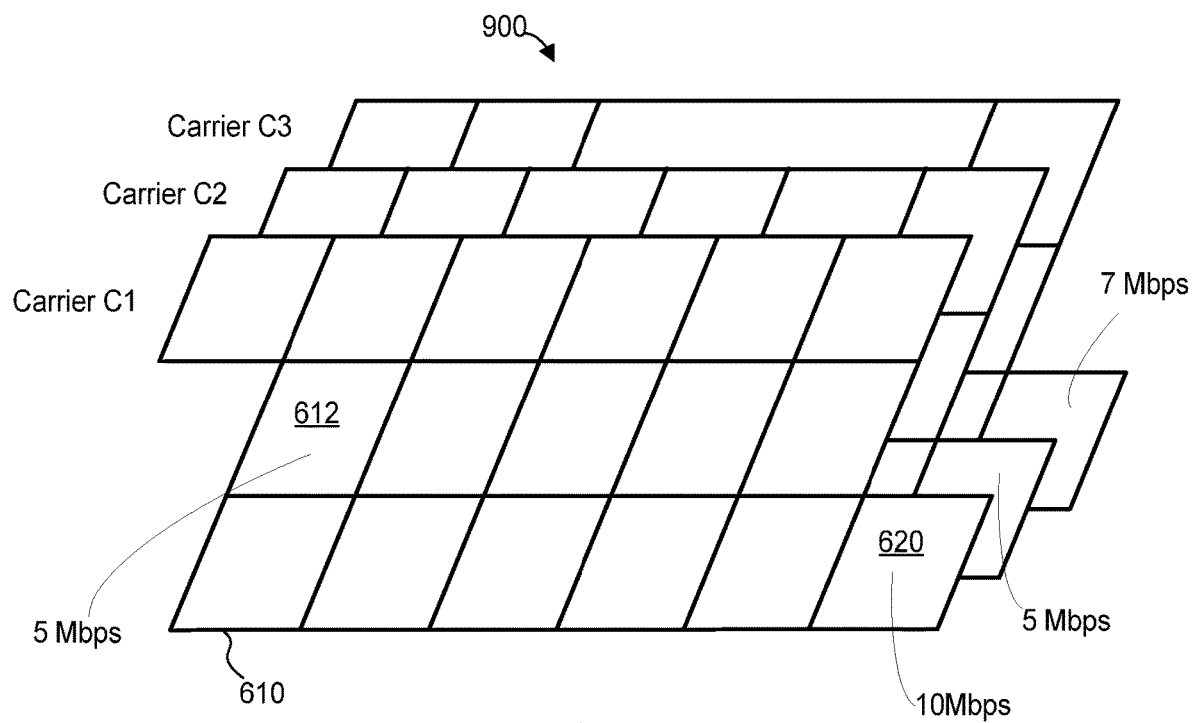
FIG. 9 illustrates an example data structure that stores, for various combinations of an S2 cell and a network carrier, an indication of expected bandwidth.

As part of finding the set of points, the offline data controller 102 at block 1106 can calculate the cost of traversing a cell. For a given cell, the offline data controller 102 can select the expected bandwidth available at the cell for the current network carrier of the client device, e.g., 5 Mbps for cell 612, as illustrated in FIG. 9. As discussed above, the client device can specify the network carrier in the request 206 (see FIG. 2). The offline data controller 102 then can multiply the expected bandwidth by the linear size of the cell and further by the expected velocity at which the client device would traverse the linear size of the cell. In an example configuration, the expected velocity is set to a fixed maximum value for a vehicle such as 100 mph or 160 kmh. In another example implementation, the offline data controller 102 determines the expected velocity based on historical data for large sets of vehicles. Thus, for example, a certain S2 can cover a densely populated urban area in which vehicles historically travel at only 40 mph or 60 kmh. The product of the bandwidth, size, and velocity corresponds to the cost of traversing the cell.

It is noted that cells with poor network coverage and accordingly low bandwidth have lower cost of traversing the cell. Thus, the same budget selected at block 1102 covers a greater number of cells of poor network coverage. The offline data controller 102 accordingly can generate padding regions that extend deep into areas of no or little coverage, such as mountain regions. However, to prevent the client device from downloading map tiles covering oceans and other areas inaccessible by cars, the offline data controller 102 can restrict the search at block 1104 to only those S2 cells that contain roads. As another example, referring back to FIG. 8, the predicted set 800 for cell 612 extends farther into the upper left corner than directly to the right of the cell 612 because the network coverage is worse at the locations a client device would traverse on the way to a location in the upper left corner.

In some implementations, the offline data controller 102 detects that the network padding expands too much for some areas (e.g., grows to encompass an entire continent), and the offline data controller 102 limits the expansion based on a maximum number of S2 cells, on a maximum distance from the location of the cell, or based on any other suitable principle.

Next, at block 1110, the size of the area generated at block 1104 is computed and set as the new budget. In particular, the offline data controller 102 can compute the total size of all the cells reachable from the given cell in accordance with the shortest path algorithm and for the budget used in the previous instance of executing block 1104.

If the size calculated at block 1110 is not larger than the previously used budget, the offline data controller 102 can determine at block 1112 than converge has been achieved and proceed to block 1114. Otherwise, if the size is larger than the previously used budget, the size is used as the new budget, and the flow returns to block 1104. The offline data controller 102 can always achieve convergence as any geographic area is finite, but in most cases convergence is achieved quickly when the sets of cells at block 1104 have robust network coverage.

Figure 10:
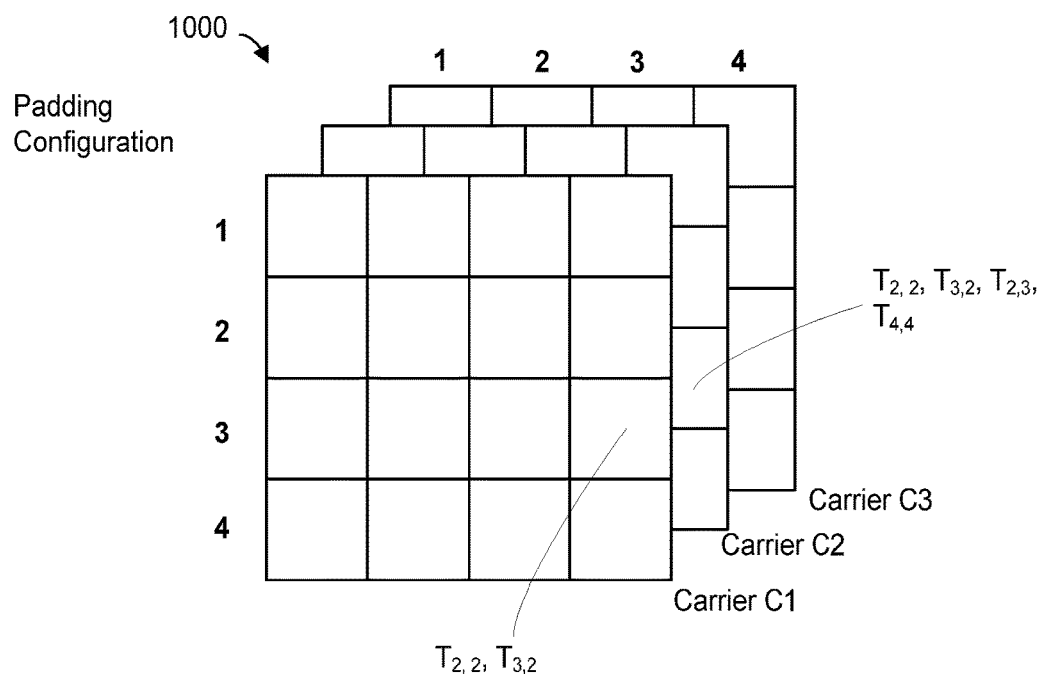
FIG. 10 illustrates an example mapping of various combinations of map tile and carrier values to lists of map tiles used in offline padding.

At block 1114, the offline data controller 102 adds a new entry to the mapping 1000 illustrated in FIG. 10. The offline data controller 102 in the example of FIG. 10 maintains these entries in the map tile format rather than the S2 cell format, and thus an entry in the table 1000 for tile $T_{4,3}$ can specify a padding region of $\{T_{2,2}, T_{3,2}, T_{2,3}, T_{4,4}\}$ when network carrier C2 is used. More generally, the offline data controller 102 can define and index padding regions in any suitable geographic format.

As one alternative to executing block 1114, when servicing requests from client devices in real time, the offline data controller 102 uses the result of executing blocks 102-112 to directly apply the padding region to the previously calculated predicted geographic area to determine the overall set of map tiles to be provided to the client device in response to the request 206.

For further clarity, FIGS. 12A-16C next illustrate several example scenarios according to which the offline management system of this disclosure can operate.

First, FIGS. 12A-C schematically illustrate, from the perspective of a client device such as the device 110 of FIG. 1, an example scenario in which the client device reaches the check-in bounds and requests additional geographic data. In the initial state of FIG. 12A, the client device has an area of offline coverage 1200. The check-in bounds 1202 delimit a region within the area of offline coverage 1200, and the current location 1204 of the client device is within the check-in bounds.

As illustrated in FIG. 12B, the client device then moves to a new location 1204-01 and reaches the check-in bounds 1202. The client device accordingly sends a message similar to the message 206 of FIG. 2 to the geographic data server, and in response the geographic data server provides additional geographic data illustrated as the shaded area 1210 and provides the updated check-in bounds 1202-01.

As a result, the area of offline geographic coverage now encompasses the regions 1200 and 1210 (FIG. 12C). The client device can continue to move to the new location 1204-02, where the client device is within the updated check-in bounds 1202-01 and accordingly does not need to request additional geographic data at the location 1204-02.

Next, FIGS. 13A-E schematically illustrate, from the perspective of a server such as the geographic data server 112 of FIG. 1, an example scenario in which the server determines what geographic data should be provided to a client device for potential offline use.

Figure 13A:
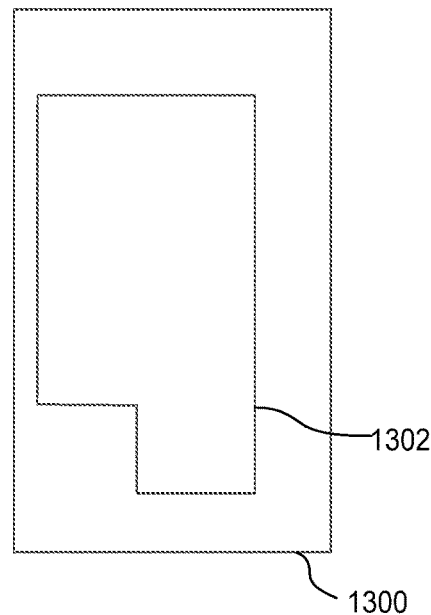
FIGS. 13A-E schematically illustrate an example scenario in which the system of FIG. 1 determines what geographic data should be provided to a client device for potential offline use.
Figure 13B:
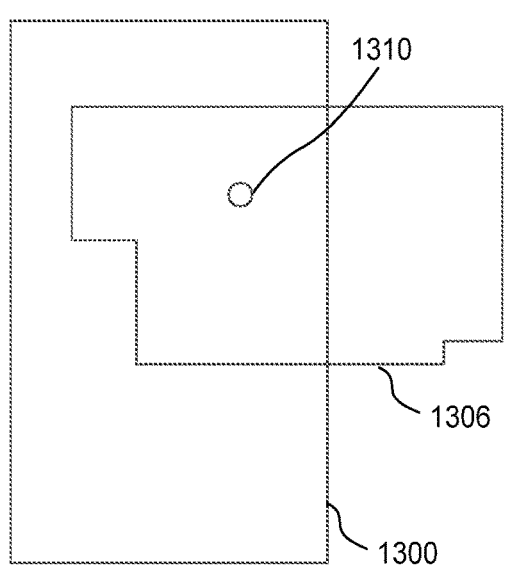
Figure 13C:
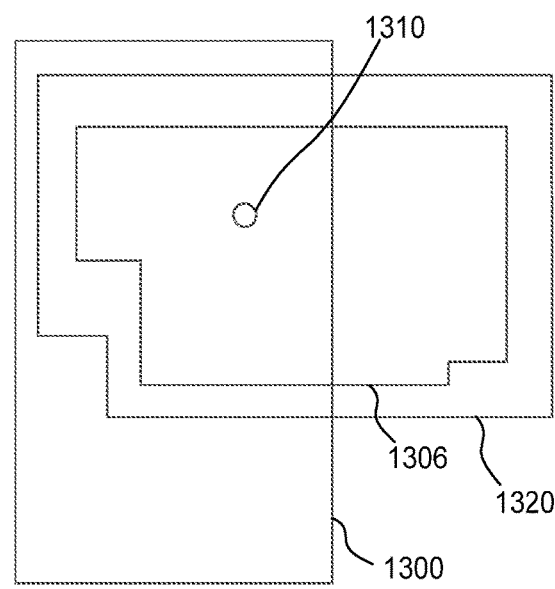
Figure 13D:
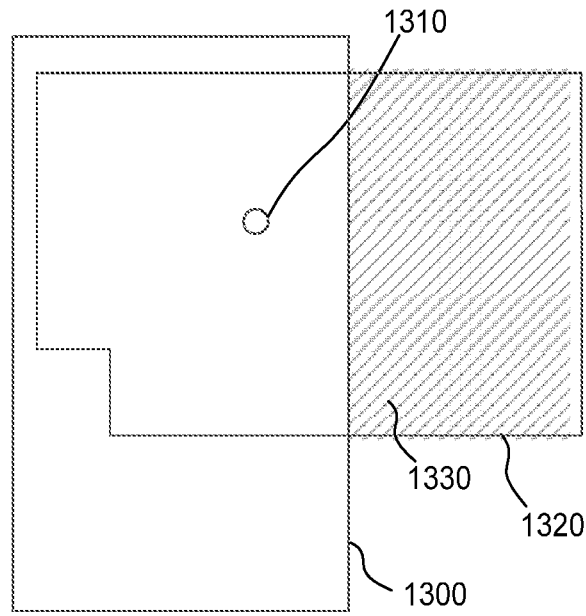
Figure 13E:
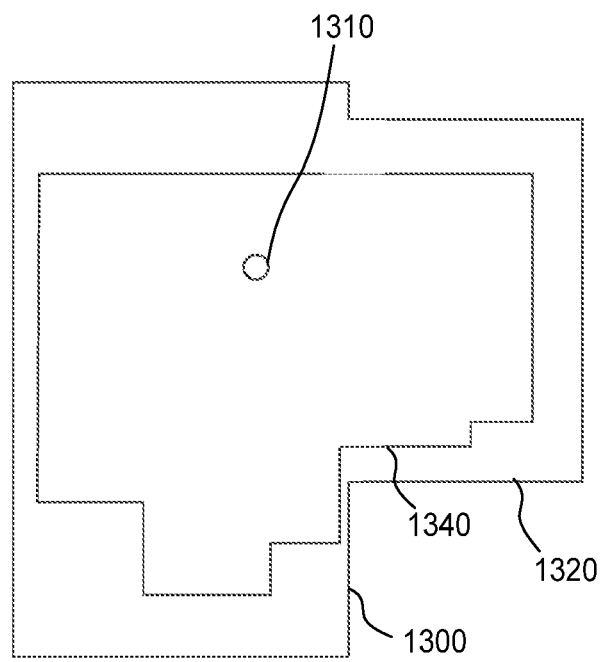

FIG. 13A illustrates an example area of offline coverage 1300, which the server erodes down to the check-in bounds 1302 based on connectivity, as discussed above. In FIG. 13B, the server determines a predicted destinations area 1306 for a location 1310. The server then can pad the predicted destinations area 1306 based on network connectivity to generate an expanded region 1320 (FIG. 13C). Then, the server can remove the existing region geometry from the expanded region 1320 to identify an area 1330 (shaded in FIG. 13D) for downloading to the client device. Finally, the server can erode the union of the geographic areas 1300 and 1320 to generate new check-in bounds 1340 (see FIG. 13E).

FIGS. 14A and 14B schematically illustrate an example scenario in which the server of FIG. 1 generates a Mercator covering for a set of S2 cells corresponding to predicted destinations of the client device. In particular, the server can generate a predicted destinations area 1400 for an S2 cell 1402 (FIG. 14A), filter the predicted destinations area 1400 based on scores to generate a modified predicted destinations area 1410 and generate a Mercator covering 1420 for the modified predicted destinations area 1410 (FIG. 14B).

FIGS. 15A-F schematically illustrate an example determination of network padding for a predicted geographic area.

Figure 15A:
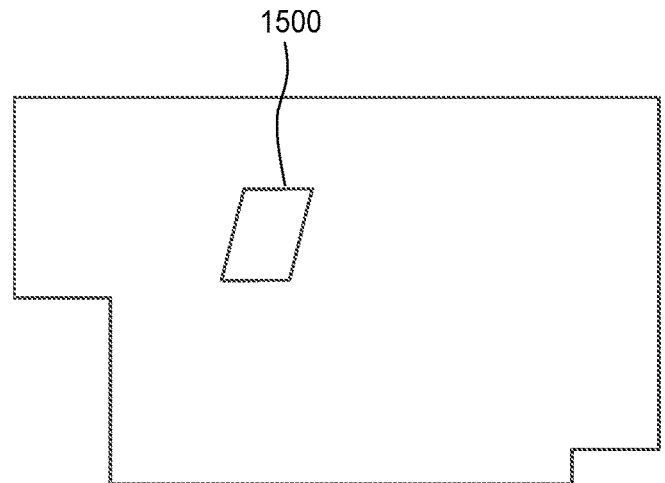
FIGS. 15A-F schematically illustrate an example scenario in which the system of FIG. 1 iteratively determines a padding region for offline geographic data.
Figure 15B:
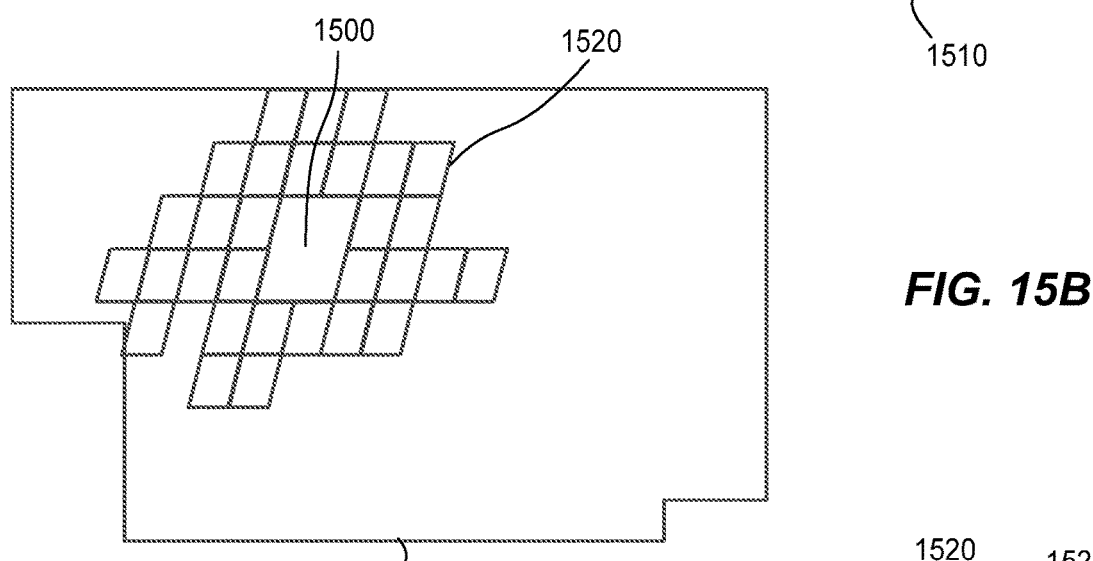

The server can compute the size of the predicted destinations area or region for every S2 cell. FIG. 15A illustrates an example predicted destinations area 1510 for a cell 1500. The server then can expand the region around the cell 1500 to cover the cells where X MB can be downloaded. The resulting region 1520 is illustrated in FIG. 15B. As discussed above, the server can apply a shortest-path search to identify cells reachable for the budget X.

Figure 15C:
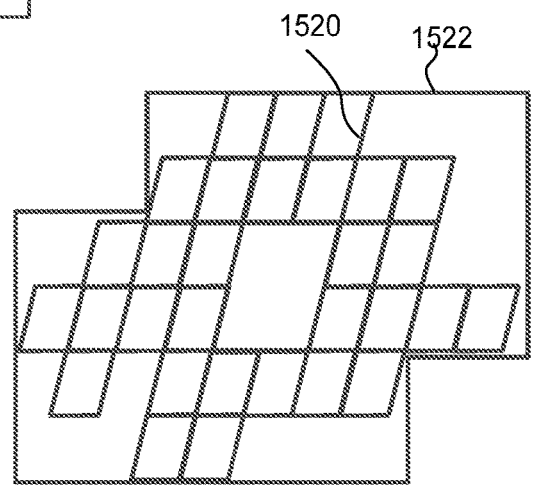
Figure 15D:
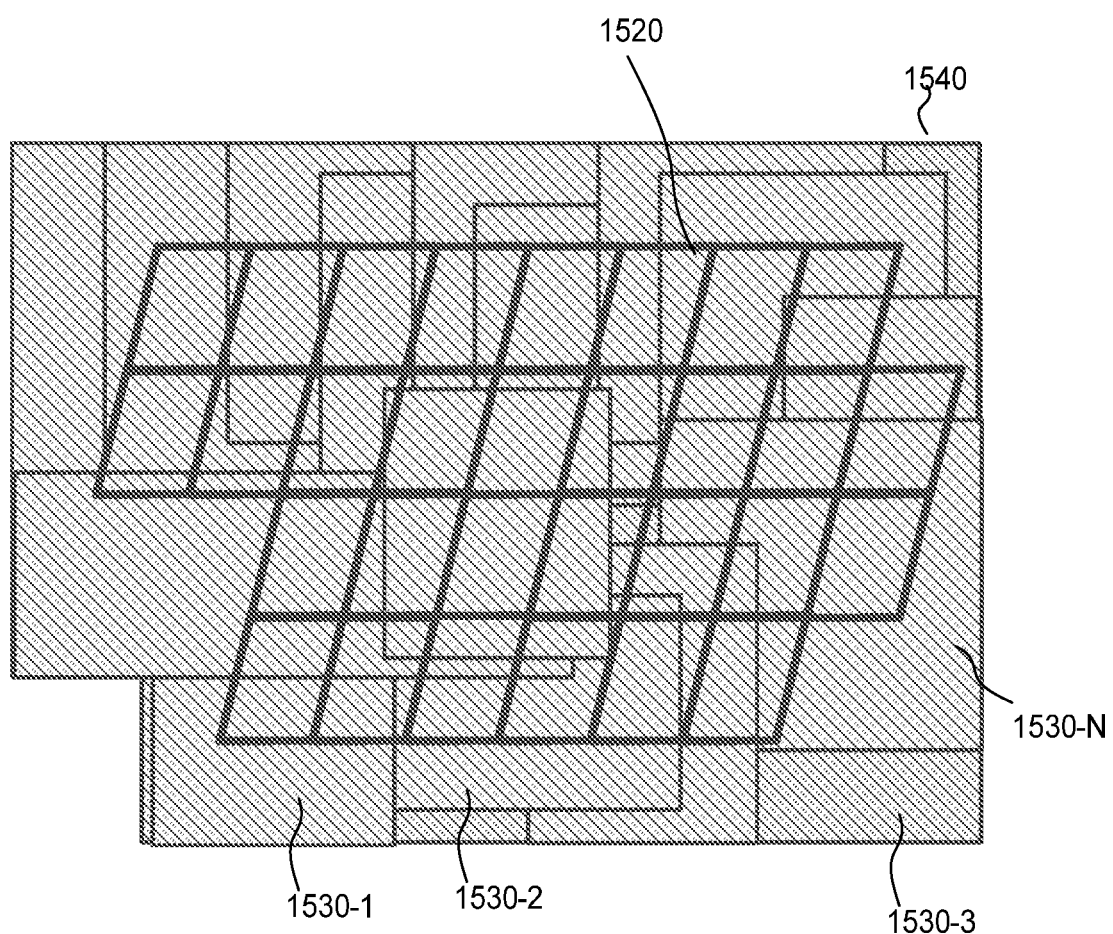
Figure 15E:
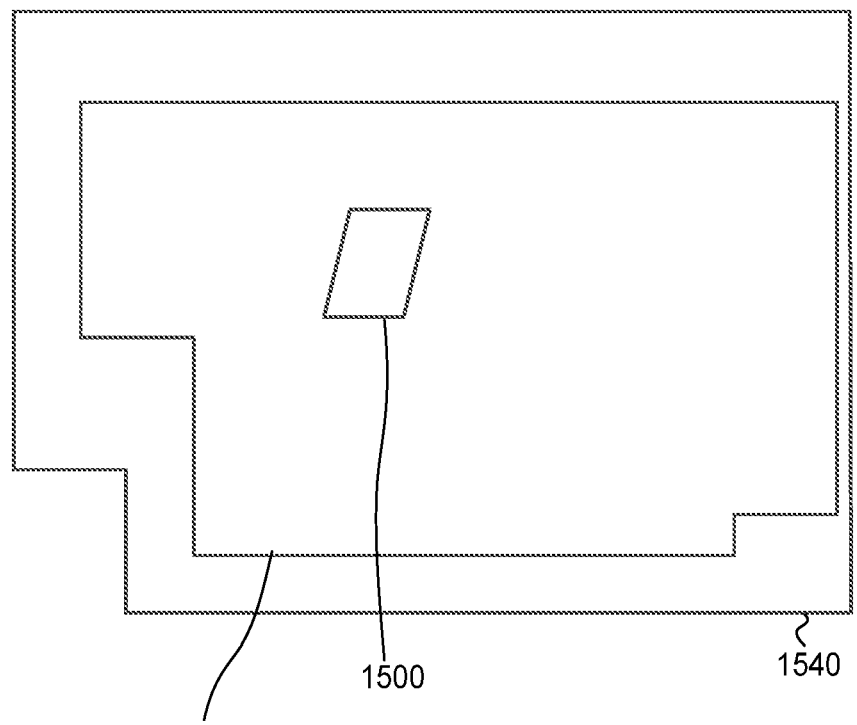
Figure 15F:
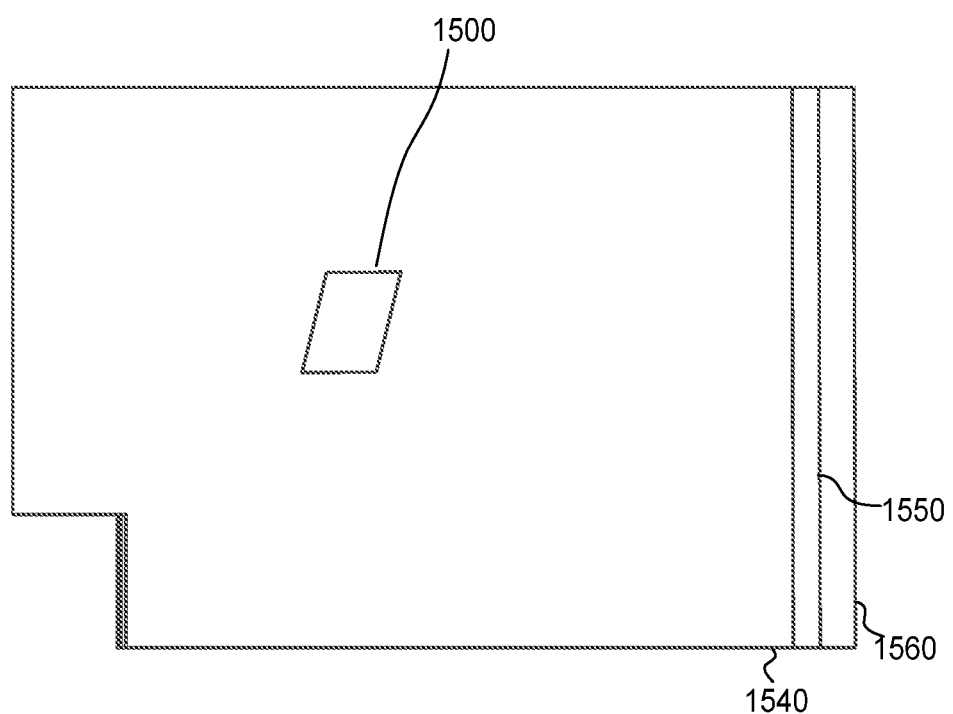

The server then can compute a Mercator covering 1522 for the region 1520 (FIG. 15C). Referring to FIG. 15D, the server then can union the network padding 1530-1, 1530-2, 1530-3, . . . 1530-N and the geographic region 1520 to generate a new area 1540 of new size X'. The regions 1540 and 1520 thus have different sizes, as illustrated more clearly in FIG. 15E. Accordingly, the new size X' is used in the new iteration of determining the network padding, and the process continues until the sizes 1540, 1550, 1560, etc. converge (FIG. 15F)

Figure 16A:
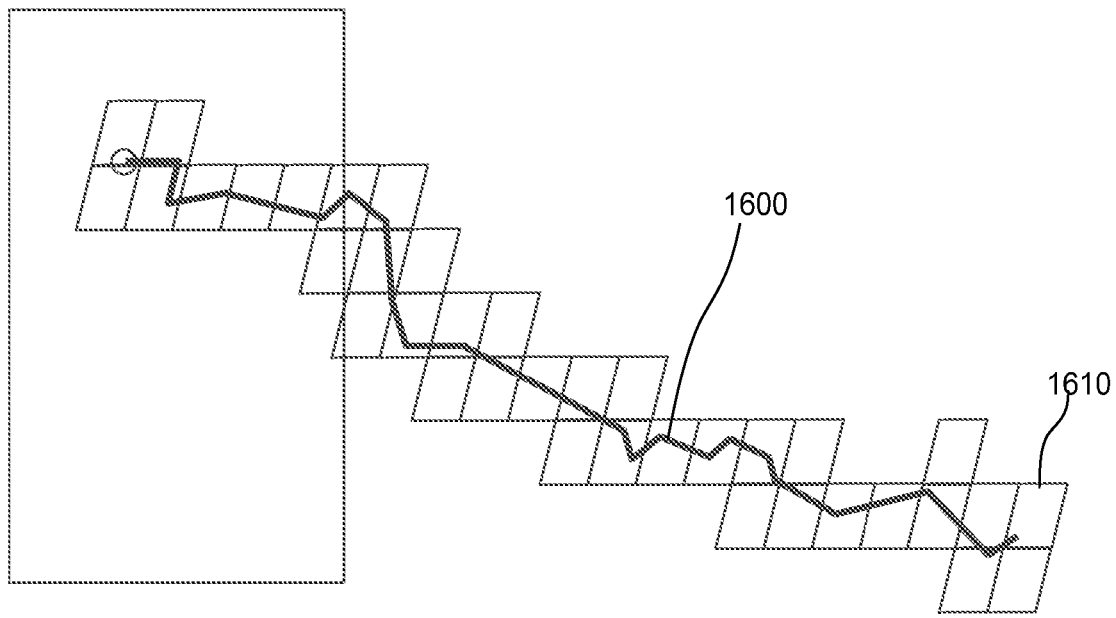
FIGS. 16A-C schematically illustrate generating a padding region for offline geographic data corresponding to a navigation route.
Figure 16B:
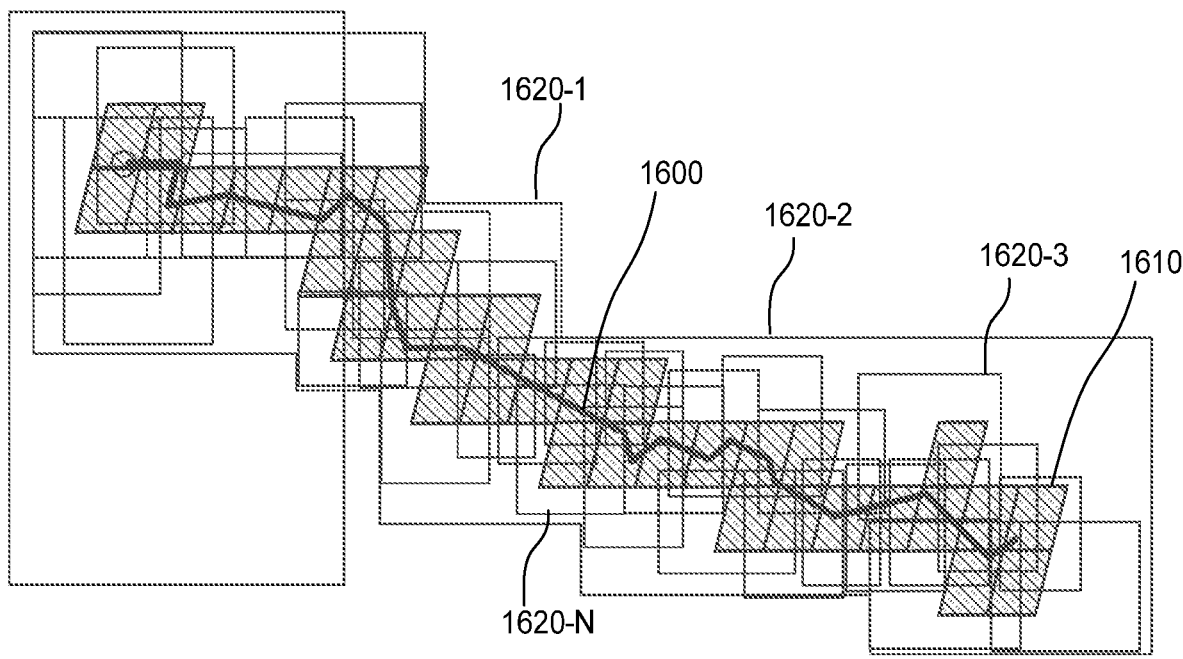

As illustrated next in FIGS. 16A-C, the process of identifying padding regions for a navigation route is generally similar to the process discussed above, except that the padding applies to the locations around the route rather than predicted destinations. In FIG. 16A, for example, the server can identify a set of cells 1610, each of which is within the certain distance of the route 1600. FIG. 16B then illustrates a union of the cells 1610 with the respective padding regions 1620-1, 1620-2, 1620-3, . . . 1620-N.

Figure 16C:
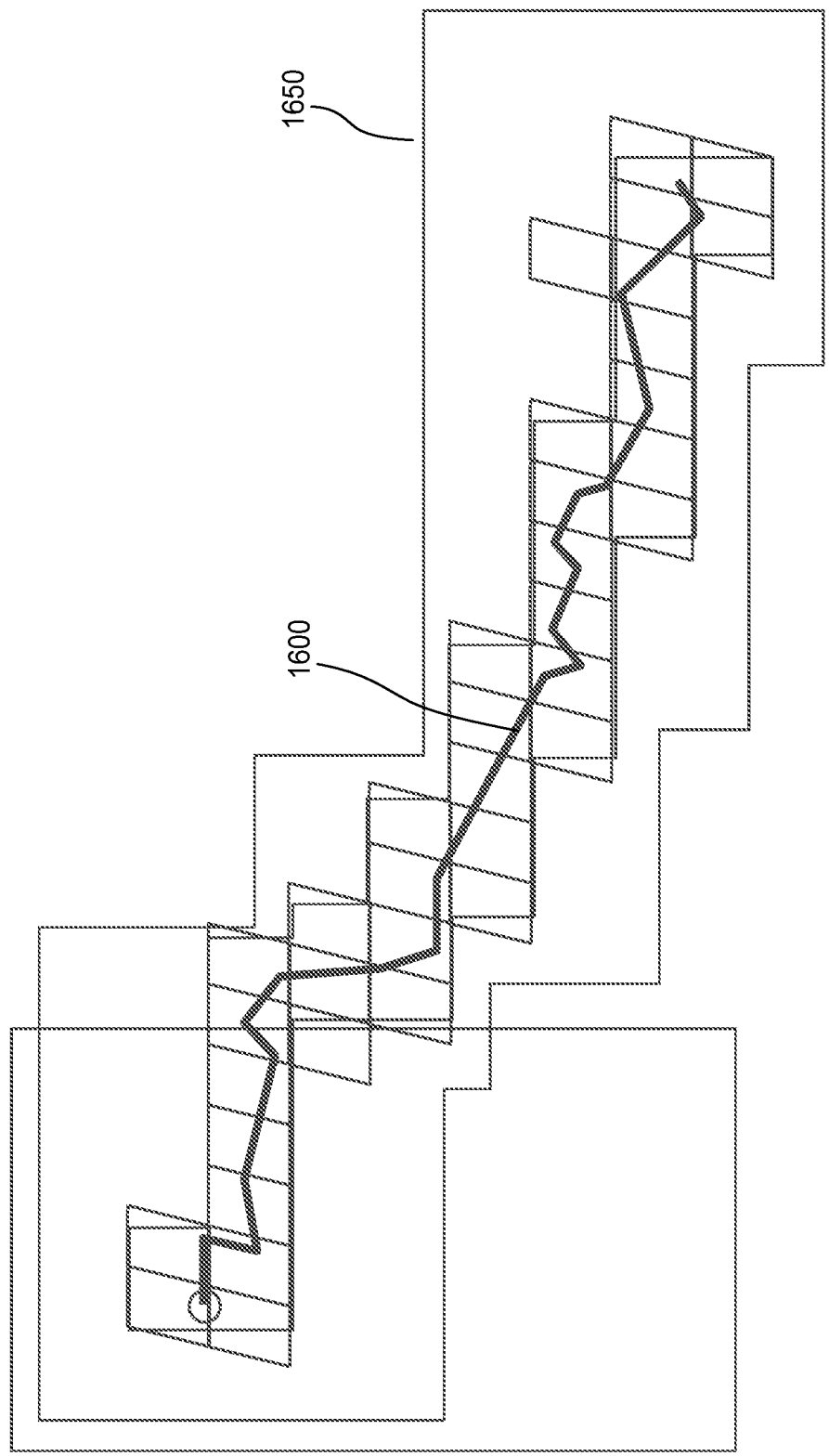

The result of this union is illustrated in FIG. 16C as the area of offline coverage 1650. The region covered by the cells 1610 defines the check-in bounds for the area of offline coverage 1650.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components and modules. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. As used herein "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configured on a processor, for example, to constitute a particular hardware module at one instance of time and to constitute a different hardware module at a different instance of time.

Hardware modules can provide information to, and receive information from, other hardware. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The methods discussed above may include one or more function blocks, modules, individual functions or routines in the form of tangible computer-executable instructions that are stored in a non-transitory computer-readable storage medium and executed using a processor of a computing device (e.g., a server, a personal computer, a smart phone, a tablet computer, a smart watch, a mobile computing device, or other personal computing device, as described herein). The methods discussed above may be included as part of any backend server (e.g., a map data server, a navigation server, or any other type of server computing device, as described herein), portable device modules of the example environment, for example, or as part of a module that is external to such an environment. Though the figures may be described with reference to the other figures for ease of explanation, the methods discussed above can be utilized with other objects and user interfaces. Furthermore, although the explanation above describes steps of the methods discussed above being performed by specific devices, this is done for illustration purposes only.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

Still further, the figures depict some embodiments of the example environment for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for generating offline geographic data through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for obtaining geographic data for offline use, the method comprising:
 storing, in a memory of a computing device, geographic data corresponding to a certain geographic area of offline coverage;
 obtaining, by one or more processors, an indication of a geographic boundary delimiting a region smaller than, and contained within, the geographic area;
 determining, by the one or more processors, a current location of the computing device relative to the geographic boundary;
 in response to determining that the current location is outside the region, retrieving additional geographic data via a wireless communication network to expand the geographic area of offline coverage and a new geographic boundary delimiting a new region within the expanded geographic area of offline coverage; and
 providing at least some of the geographic data corresponding to the expanded geographic area via a user interface of the computing device when the computing device is offline.

2. The method of claim 1, wherein retrieving the additional geographic data includes transmitting, to a network server, a request specifying the current location of the computing device and the geographic area of offline coverage.

3. The method of claim 2, wherein the request further specifies a network carrier of the computing device at the current location.

4. The method of claim 2, wherein the request further specifies a navigation route which the computing device is following.

5. The method claim of claim 2, wherein the request further specifies a current speed and/or an expected future speed of travel of the computing device.

6. The method of claim 1, wherein retrieving the additional geographic data includes receiving, from a network server, geographic data for locations to which the computing device is likely to travel.

7. The method of claim 1, wherein requesting the additional geographic data includes requesting map data for rendering digital maps.

8. A computing device comprising:
 one or more processors; and
 a memory implemented as a non-transitory computer-readable medium storing thereon instructions that, when executed by the one or more processors, cause the computing device to:
  store, in the memory, geographic data corresponding to a certain geographic area of offline coverage,
  obtain an indication of a geographic boundary delimiting a region smaller than, and contained within, the geographic area,
  determine a current location of the computing device relative to the geographic boundary,
  in response to determining that the current location is outside the region, retrieve additional geographic data via a wireless communication network to expand the geographic area of offline coverage and a new geographic boundary delimiting a new region within the expanded geographic area of offline coverage; and
  provide at least some of the geographic data corresponding to the expanded geographic area via a user interface of the computing device when the computing device is offline.

9. The computing device of claim 8, wherein to retrieve the additional geographic data, the computing device transmits a request specifying:
 the current location of the computing device,
 the geographic area of offline coverage, and
 at least one of (i) a network carrier of the computing device at the current location, (ii) a navigation route which the computing device is following, (iii) a current speed and/or an expected future speed of travel of the computing device, or (iii) geographic data for locations to which the computing device is likely to travel.

* * * * *